United States Patent
Hetherington et al.

(10) Patent No.: US 12,348,641 B2
(45) Date of Patent: Jul. 1, 2025

(54) AUTHENTICATION AND KEY REGENERATION USING A REGENERATED SECRET

(71) Applicant: BKey, Inc., Schaumburg, IL (US)

(72) Inventors: Mark D. Hetherington, Crystal Lake, IL (US); Jorn Lyseggen, London (GB); Edgardo M. Cruz-Zeno, Round Lake, IL (US); Nai Sum Wong, Palatine, IL (US); Ming Dai, Buffalo Grove, IL (US)

(73) Assignee: BKey, Inc., Schaumburg, IL (US)

( * ) Notice: Subject to any disclaimer, the term of this patent is extended or adjusted under 35 U.S.C. 154(b) by 0 days.

(21) Appl. No.: 18/770,587

(22) Filed: Jul. 11, 2024

(65) Prior Publication Data
US 2025/0023737 A1   Jan. 16, 2025

Related U.S. Application Data

(60) Provisional application No. 63/513,114, filed on Jul. 11, 2023.

(51) Int. Cl.
*H04L 9/32* (2006.01)
*H04L 9/08* (2006.01)

(52) U.S. Cl.
CPC .......... *H04L 9/3236* (2013.01); *H04L 9/0825* (2013.01); *H04L 9/0869* (2013.01)

(58) Field of Classification Search
CPC .... H04L 9/3236; H04L 9/0825; H04L 9/0869
USPC ....................................................... 713/168
See application file for complete search history.

(56) References Cited

U.S. PATENT DOCUMENTS

| | | | |
|---|---|---|---|
| 7,999,863 B2 | 8/2011 | Nakamura | |
| 8,959,364 B2 | 2/2015 | Kevenaar et al. | |
| 9,160,532 B2* | 10/2015 | Pizano | H04L 9/0816 |
| 10,764,054 B2 | 9/2020 | Herder, III et al. | |
| 11,115,203 B2 | 9/2021 | Herder, III et al. | |
| 11,343,099 B2 | 5/2022 | Herder, III et al. | |
| 11,451,385 B2 | 9/2022 | Herder, III et al. | |
| 2008/0013721 A1 | 1/2008 | Hwang | |
| 2010/0017618 A1* | 1/2010 | Golic | H04L 9/3231 |
| | | | 713/186 |

(Continued)

FOREIGN PATENT DOCUMENTS

WO   2022043850 A1   3/2022

OTHER PUBLICATIONS

International Search Report and Written Opinion of PCT Patent Application No. PCT/US2024/037675 mailed Oct. 21, 2024, 9 pgs.

(Continued)

*Primary Examiner* — Moeen Khan
(74) *Attorney, Agent, or Firm* — Buchalter; Jason W. Croft

(57) ABSTRACT

Disclosed herein is a method including identifying a first instance of a first secret; receiving and hashing a first instance of first data from a first source to generate a first instance of first hashed data, wherein the first instance of the first data from the first source is discarded; computing a first mapping function between the first instance of the first hashed data and the first instance of the first secret, wherein the first mapping function is stored and the first instance of the first hashed data and the first instance of the first secret are discarded; receiving and hashing a second instance of the first data from the first source to generate a second instance of the first hashed data; and applying the first mapping function to the second instance of the first hashed data to generate a second instance of the first secret.

27 Claims, 23 Drawing Sheets

(56) References Cited

U.S. PATENT DOCUMENTS

| | | |
|---|---|---|
| 2010/0202609 A1 | 8/2010 | Sandhu et al. |
| 2012/0237024 A1 | 9/2012 | Liu et al. |
| 2016/0119138 A1 | 4/2016 | Pizano et al. |
| 2017/0185761 A1 | 6/2017 | Stanwood et al. |
| 2019/0005470 A1 | 1/2019 | Uhr et al. |
| 2020/0065463 A1* | 2/2020 | Ryu .................... G06V 40/18 |
| 2020/0252203 A1* | 8/2020 | Benini ............... G06F 16/2379 |
| 2020/0252217 A1* | 8/2020 | Mathieu ............... H04L 9/0643 |
| 2021/0019450 A1* | 1/2021 | Li ......................... G11C 29/44 |
| 2021/0110061 A1 | 4/2021 | Sharma et al. |
| 2021/0165794 A1 | 6/2021 | Armour et al. |
| 2022/0182216 A1 | 6/2022 | Hamburg et al. |
| 2023/0318820 A1 | 10/2023 | Fooksman et al. |
| 2023/0403144 A1 | 12/2023 | Rhodin |

OTHER PUBLICATIONS

"What is BIP39?", Coinplate, Jan. 4, 2022, Retried from the URL: https://getcoinplate.com/blog/what-is-bip39/?v=7516fd43adaa, retrieved on Sep. 10, 2024, 15 Pages.

International Search Report and Written Opinion of PCT Application No. PCT/US2024/037674 mailed Oct. 1, 2024, 9 pgs.

Office Action of U.S. Appl. No. 18/770,578 mailed Sep. 12, 2024, 16 pgs.

Tuyls et al., "Practical Biometric Authentication with Template Protection", Audio- and Video-Based Biometric Person Authentication, Lecture Notes in Computer Science, vol. 3546, Jul. 2005, pp. 436-446.

Final Office Action for U.S. Appl. No. 18/770,578, dated Jan. 2, 2025, 18 pages.

\* cited by examiner

AUTHENTICATION AND KEY REGENERATION USING A REGENERATED SECRET

RELATED APPLICATION

This application claims the benefit of U.S. Provisional Application No. 63/513,114, filed Jul. 11, 2023, the disclosure of which is incorporated herein by reference in its entirety.

This disclosure relates to authentication and key regeneration.

BACKGROUND

Unless otherwise indicated herein, the materials described herein are not prior art to the claims in the present application and are not admitted to be prior art by inclusion in this section.

A cryptographic key may be a string of data that is used to lock or unlock cryptographic functions, including authentication, authorization, and encryption. Cryptographic keys may be used in many different areas, such as to encrypt sensitive data (bank transactions, private email, web-traffic, etc.), provide tamper-proof signing of documents, cryptocurrency, or the like.

The subject matter claimed in the present disclosure is not limited to implementations that solve any disadvantages or that operate only in environments such as those described above. Rather, this background is only provided to illustrate one example technology area where some examples described in the present disclosure may be practiced.

SUMMARY

In one example, a method may include identifying a first instance of a first secret; receiving and hashing a first instance of first data from a first source to generate a first instance of first hashed data, in which the first instance of the first data from the first source is discarded; computing a first mapping function between the first instance of the first hashed data and the first instance of the first secret, in which the first mapping function is stored and the first instance of the first hashed data and the first instance of the first secret are discarded; receiving and hashing a second instance of the first data from the first source to generate a second instance of the first hashed data; applying the first mapping function to the second instance of the first hashed data to generate a second instance of the first secret; and generating a key using the second instance of the first secret.

In another example, a method may include identifying a first instance of a first secret; generating a first instance of a first codeword based on the first instance of the first secret; receiving a first instance of first data from a first source; computing a mapping function between the first instance of first data from the first source and the first instance of the first codeword, in which the mapping function is stored and the first instance of first data from the first source and the first instance of the first codeword are discarded; receiving a second instance of first data from the first source; applying the mapping function to the second instance of first data from the first source to generate a second instance of the first codeword; generating a second instance of the first secret based on the second instance of the first codeword; and generating a key using the second instance of the first secret as a key seed.

In another example, a method may include identifying a first instance of a first secret and a first instance of a second secret; generating a first instance of a first codeword based on the first instance of the second secret; receiving and hashing a first instance of first data from a first source to generate a first instance of first hashed data, wherein the first instance of the first data from the first source is discarded; receiving a first instance of second data from a second source; computing a first mapping function between the first instance of the first hashed data and the first instance of the first secret, wherein the first mapping function is stored and the first instance of the first hashed data and the first instance of the first secret are discarded; and computing a second mapping function between the first instance of second data from the second source and the first instance of the first codeword, in which the mapping function is stored and the first instance of second data from the second source and the first instance of the first codeword are discarded.

In another example, a method may include identifying a first key seed for an external key; generating a second key seed from a first instance of first data from a first source; computing a mapping function between the first key seed and the second key seed, wherein the mapping function is stored and the first key seed and second key seed are discarded; generating a third key seed from a second instance of second data from a second source; applying the mapping function to the third key seed to generate a fourth key seed; and regenerating the external key using the fourth key seed.

The object and advantages of the examples will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Examples will be described and explained with additional specificity and detail through the use of the accompanying drawings in which.

DETAILED DESCRIPTION

Cryptographic keys may be symmetric or asymmetric. For symmetric cryptographic keys, both the sender and the receiver use the same key. Asymmetric cryptographic key techniques, use a public/private key pair, in which the sender encrypts with the receiver's public key, and the receiver decrypts with his private key.

Cryptographic keys may be generated randomly and stored on a device. Cryptographic keys are to be well protected to avoid being exposed to an adversarial party. With key exposure, an attacker may gain access that is intended for the owner. Some examples of problems that may occur include: (i) decrypting sensitive documents, (ii) intercepting encrypted communications and financial transactions, (iii) digitally signing documents as the owner, and (iv) accessing the owner's crypto wallet. Loss of keys may also be problematic for additional reasons. For example, backup systems may be used to allow an owner to recover keys stored on a lost or stolen device because loss of keys may result in loss of access to encrypted documents or cryptocurrency.

Cryptographic keys may be constructed from a key seed. The key seed may provide the entropy used to create strong cryptographic keys. In many cases, the key seed may be chosen randomly by the device that is creating the key. Key seeds may be created from passwords or lists of keywords, such as in cases where an owner wants to have control over the key or wants to have the ability to recover a key.

In many cases, the password or keywords for the key seed may be encrypted using a cryptographic one way hash function. Passwords or keywords may have a one-to-one relationship with the key seed and keys. Changing a password or keywords may cause a different key seed and keys to be created.

Key seeds may also be created from biometrics (e.g., face, fingerprint, iris, etc.). However, biometric entropy may be too low to create a strong cryptographic key. Moreover, biometric measurements may have natural variation between samples that may not generate reliable cryptographic keys.

Examples of the present disclosure will be explained with reference to the accompanying drawings.

Figure 1:
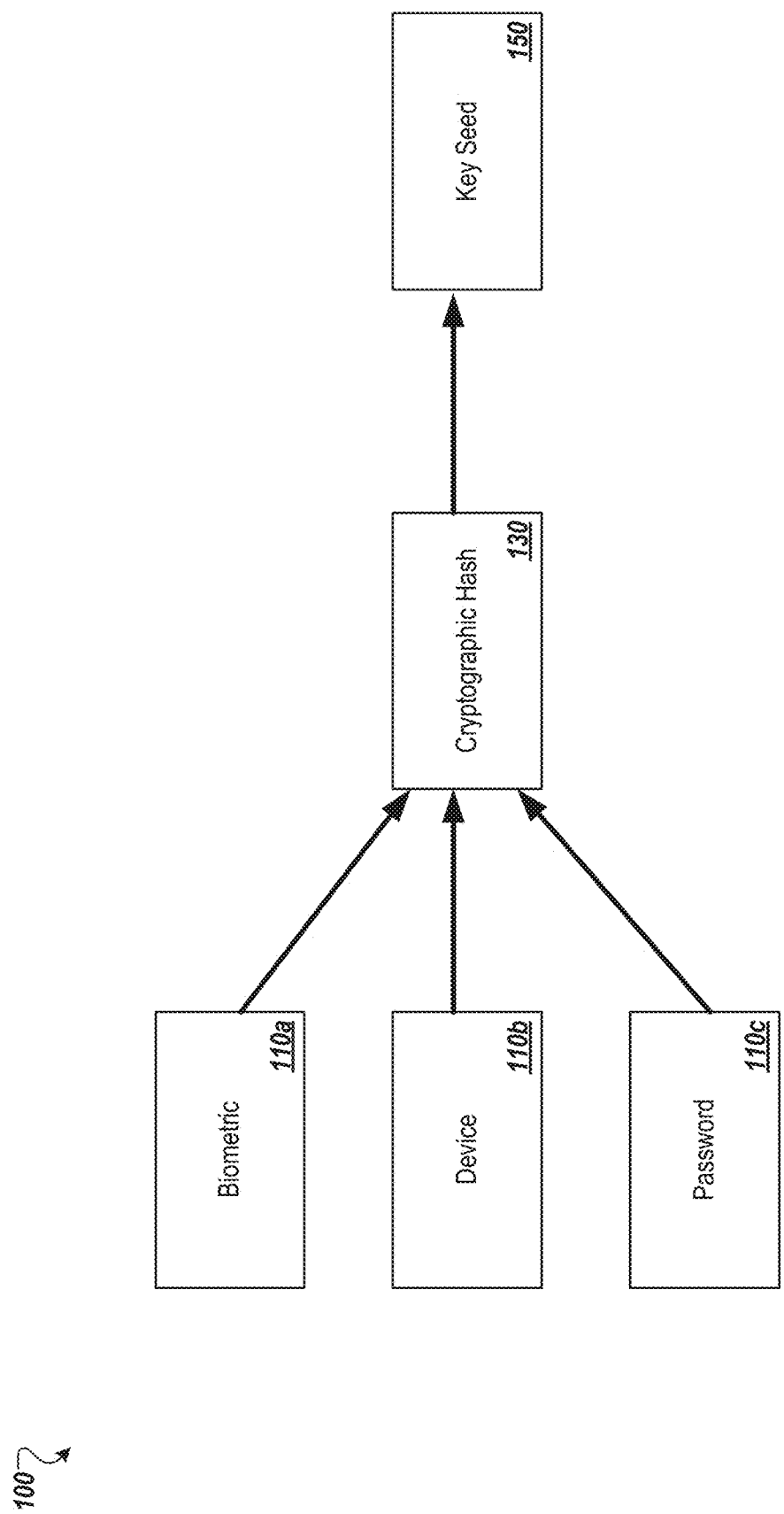
FIG. 1 illustrates an example block diagram for generating a key seed using multiple factors.

As illustrated in the system 100 in FIG. 1, multi-factor keys may offer enhanced security for a cryptographic key. The factors in a multi-factor authentication system may be any factor. Some examples include: (i) something you ARE such as a biometric 110a; (ii) something you HAVE such as a device 110b or near field communication (NFC)/Smart card; and (iii) something you KNOW such as a Password 110c or a personal identification number (PIN). The Biometric 110a, the device 110b, and the password 110c may be combined to generate a cryptographic hash 130. The cryptographic hash 130 may be used to generate the key seed 150. Keys may be regenerated when the factors are matching.

In a multi-factor authentication system, one factor by itself may not expose the key. Therefore, when a device 110b is stolen, when a password 110c is compromised, or a biometric 110a is compromised, an attacker may not gain access to the key when the attacker has access to one of the device 110b, the password 110c, or the biometric 110a. Nonetheless, under certain systems, updating the biometric 110a, device 110b, or password 110c may produce a new key. That is, updates to the biometric 110a, the device 110b, or the password 110c may not be possible while maintaining the same key.

Aspects of the present disclosure provide enhancements to single-factor authentication and key regeneration and multi-factor authentication and key regeneration. Moreover, in the present disclosure, private keys may not be stored or kept secret, which further enhances the flexibility and robustness of the encryption scheme. Further, the present disclosure makes brute force attempts to crack the encryption extremely difficult.

Figure 2:
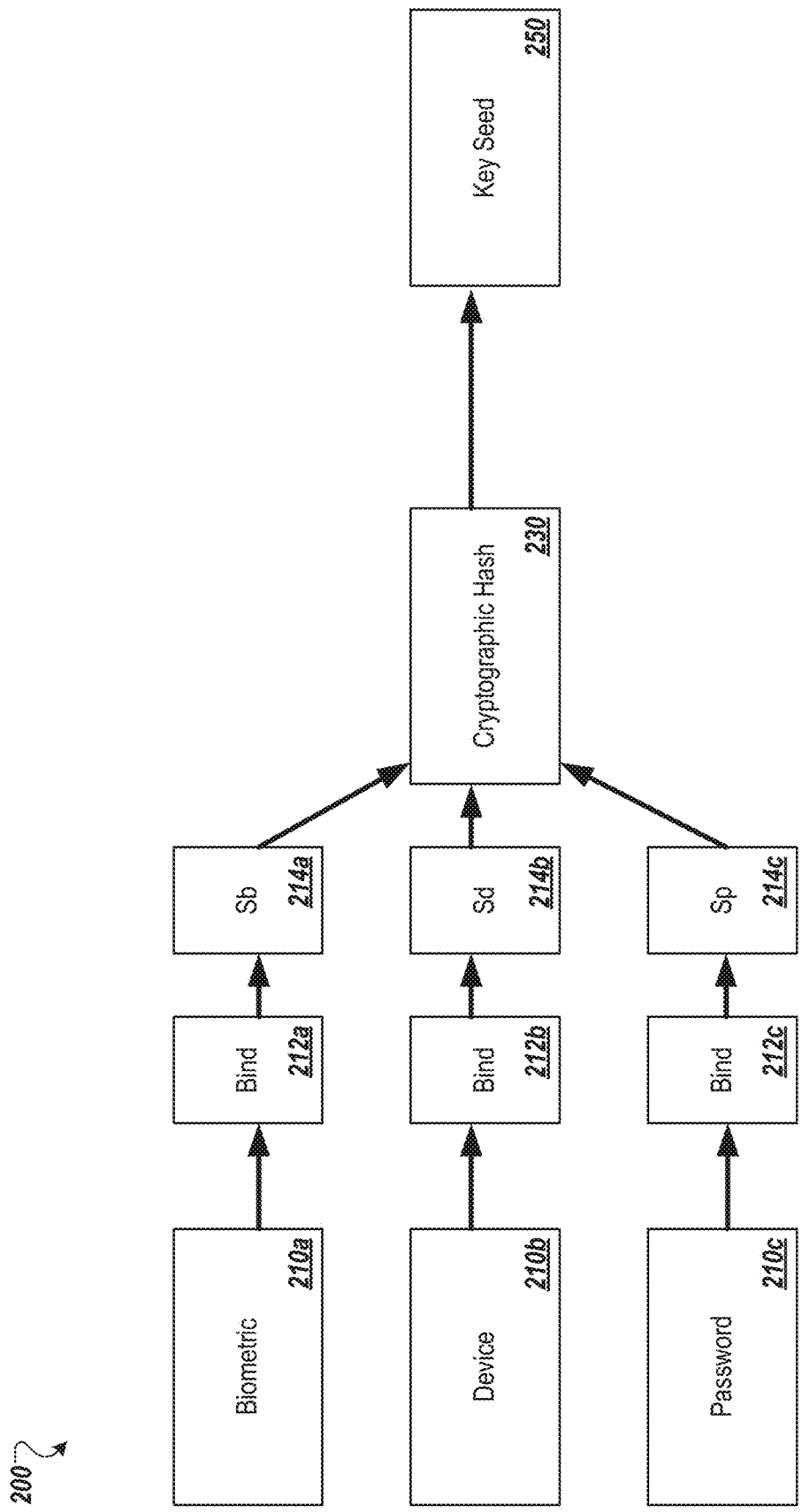
FIG. 2 illustrates an example block diagram for generating a key seed using multiple factors and multiple secrets.

As illustrated in the system 200 in FIG. 2, the present disclosure introduces binding the factor (e.g., the biometric (b) 210a, device (d) 210b, or password (p) 210c) to an intermediate value, character, number, or the like (i.e., the secret). The biometric 210a may bind 212a the secret ($S_b$) 214a. The device 210b may bind 212b the secret ($S_d$) 214b. The password 210c may bind 212c the secret ($S_p$) 214c.

The secrets (i.e., $S_b$ 214a+$S_d$ 214b+$S_p$ 214c) may be combined to create the key seed 250. In one example, the secrets ($S_b$ 214a+$S_d$ 214b+$S_p$ 214c) may be combined and hashed using a cryptographic hash 230 to generate the key seed 250. In another example, the secrets ($S_b$ 214a+$S_d$ 214b+$S_p$ 214c) may be combined by multiplexing the secrets ($S_b$ 214a+$S_d$ 214b+$S_p$ 214c).

By binding the factors (e.g., the biometric (b) 210a, device (d) 210b, or password (p) 210c) to the secrets ($S_b$ 214a+$S_d$ 214b+$S_p$ 214c), the different factors (e.g., biometric (b) 210a, device (d) 210b, or password (p) 210c) may be updated by creating a new binding to the same secrets (($S_b$ 214a+$S_d$ 214b+$S_p$ 214c). That is, the binding 212a may be updated to bind an updated biometric, or the binding 212b may be updated to bind an updated device, or the binding 212c may be updated to bind an updated password 210c.

Figure 3A:
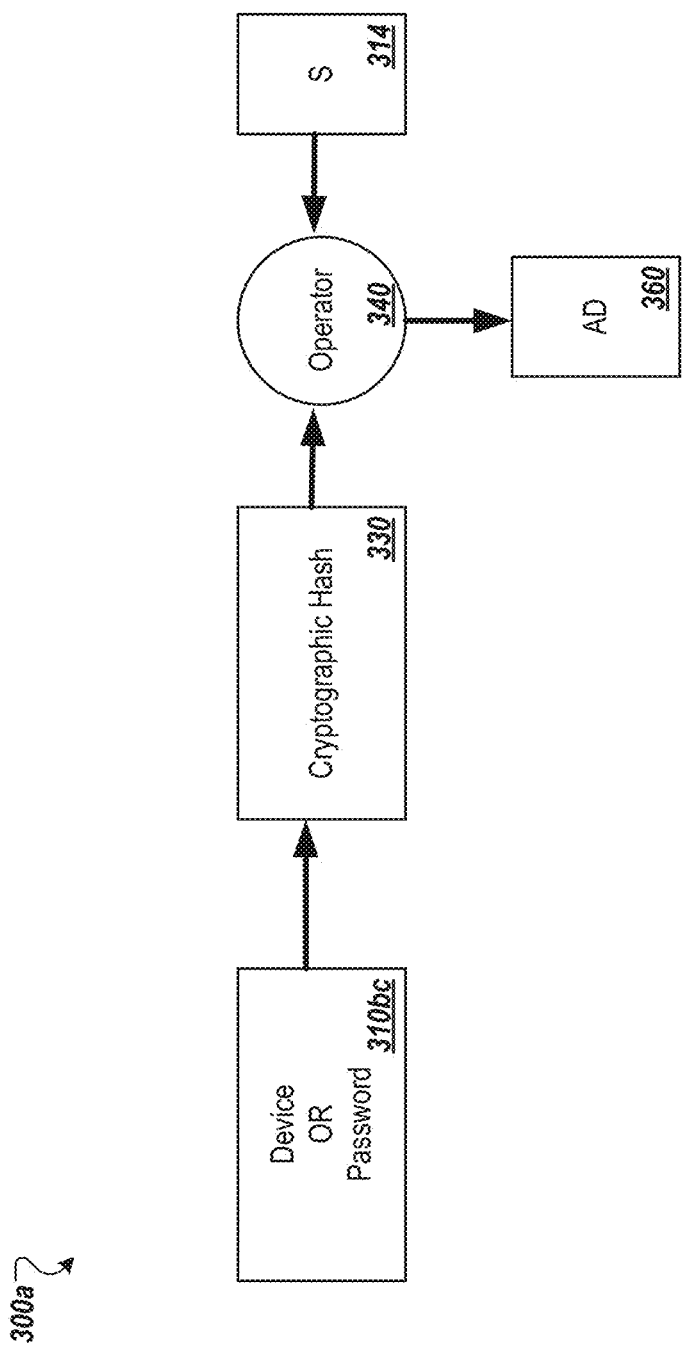
FIG. 3A illustrates an example block diagram for combining error-free sources with a secret to generate a mapping function.

As illustrated in the system 300a in FIG. 3A, in order to generate the secret(S) 314 for error-free sources (e.g., device or password 310bc), the source data (e.g., the device of password 310bc) may be hashed using the cryptographic hash 330 and operated on using an operator 340 (e.g., which may be an XOR operator, an XNOR operator, or the like)

with the secret S 314 to produce a mapping function (e.g., Auxiliary Data (AD) 360). The mapping function (e.g., AD 360) may be a combination of two or more secrets. For example, a cryptographic hash 330 of a password and a device may be operated on using an operator 340 to generate a mapping function (e.g., auxiliary data 360). XOR and XNOR are examples of operators that may be applied to data. Any suitable technique or other function, process, or binding function may be used.

The mapping function (e.g., AD 360) may be a mapping between two numbers (e.g., two random or pseudorandom numbers). One random number, for example, may include a cryptographic hash of the factor (e.g., the password, device or biometric data). The factor (e.g., the password, device, and biometric data) may be further protected by the one-way nature of the cryptographic hash because the factor may not be recovered without the mapping function (e.g., AD 360). The other random number may include S 314 that is being bound to the factor. The mapping function (e.g., AD 360) may contain relative information that is useful when one of the two random numbers (i.e., the factor data or the secret) is known. The mapping function (e.g., AD 360) by itself may be stored without revealing any useful information. The mapping function (e.g., AD 360) may be encrypted to add another layer of protection.

S 314 may be a randomly chosen value and may be used in the key seed hash function. S 314 may be a secret that a user may have already, such as a previously generated secret S 314 that the user desired to keep and continue to use. This may be beneficial for transferring to new hardware, such as a new mobile phone or electronic wallet.

Error-free user data (e.g., the device or password 310*bc*) may be used to generate a key seed. The process for generating the key seed may include one or more of: (i) choosing an S 314 (e.g., a large number, a random number, or both), (ii) performing a cryptographic hash 330 of the error-free user data U (e.g., the device or password 310*bc*) to create a hash number H (e.g., a large hash number), (iii) operating on (e.g., using an operator 340 such as XOR, XNOR, or the like) S 314 and H to generate a mapping number M, (iv) storing the mapping number M in a user template, or (v) using S 314 as a contribution to generate the key seed. U may be the generalized input to a hash which may be a password, device ID, or any suitable error-free source. The hash number H may be the output of a hash function. The AD 360 may include a mapping number (e.g., a binary difference) between the H and the secret S to facilitate mapping between the H and the S.

Figure 3B:
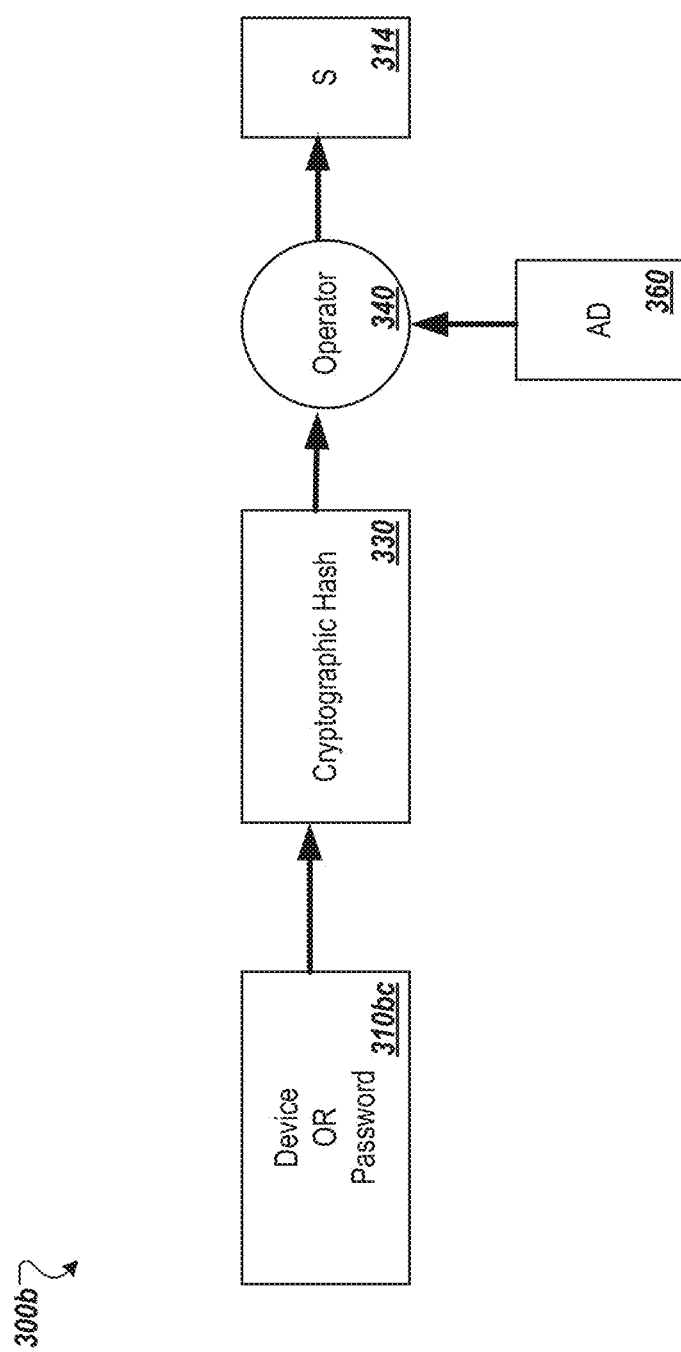
FIG. 3B illustrates an example block diagram for combining error-free sources with a mapping function to regenerate a secret.

As illustrated in the system 300*b* in FIG. 3B, the device or password 310*bc* may be hashed using cryptographic hash 330. The cryptographic hash 330 and the AD 360 may be operated on using the operator 340 (which may be an XOR operator, an XNOR operator, or any other suitable operator) to regenerate S 314. The AD 360 may be stored to facilitate regeneration of S 314. The AD 360 may not reveal any information about the source data (e.g., the device or password 310*bc*) or S 314. The AD 360 may provide meaning when the correct source data (e.g., the device or password 310*bc*) is provided. When S 314 is regenerated, S 314 may be passed to a key seed hash function to generate a hashed secret which may be used to regenerate the key seed.

Error-free user data (e.g., the device or password 310*bc*) may be used to regenerate a key seed. The process for regenerating the key seed may include one or more of: (i) retrieving a mapping number M (e.g., AD 360) from a user template, (ii) perform a cryptographic hash of the error-free user data (e.g., the device or password 310*bc*) to create a hash number H (e.g., a large hash number), (iii) regenerate S 314 by operating on M (e.g., AD 360) and H using an operator 340 (e.g., XOR, XNOR, or the like), (iv) create a hashed secret ($S_H$) by applying a cryptographic hash to S 314, (v) use the hashed secret ($S_H$) as part of a key seed to regenerate a key.

Figure 4:
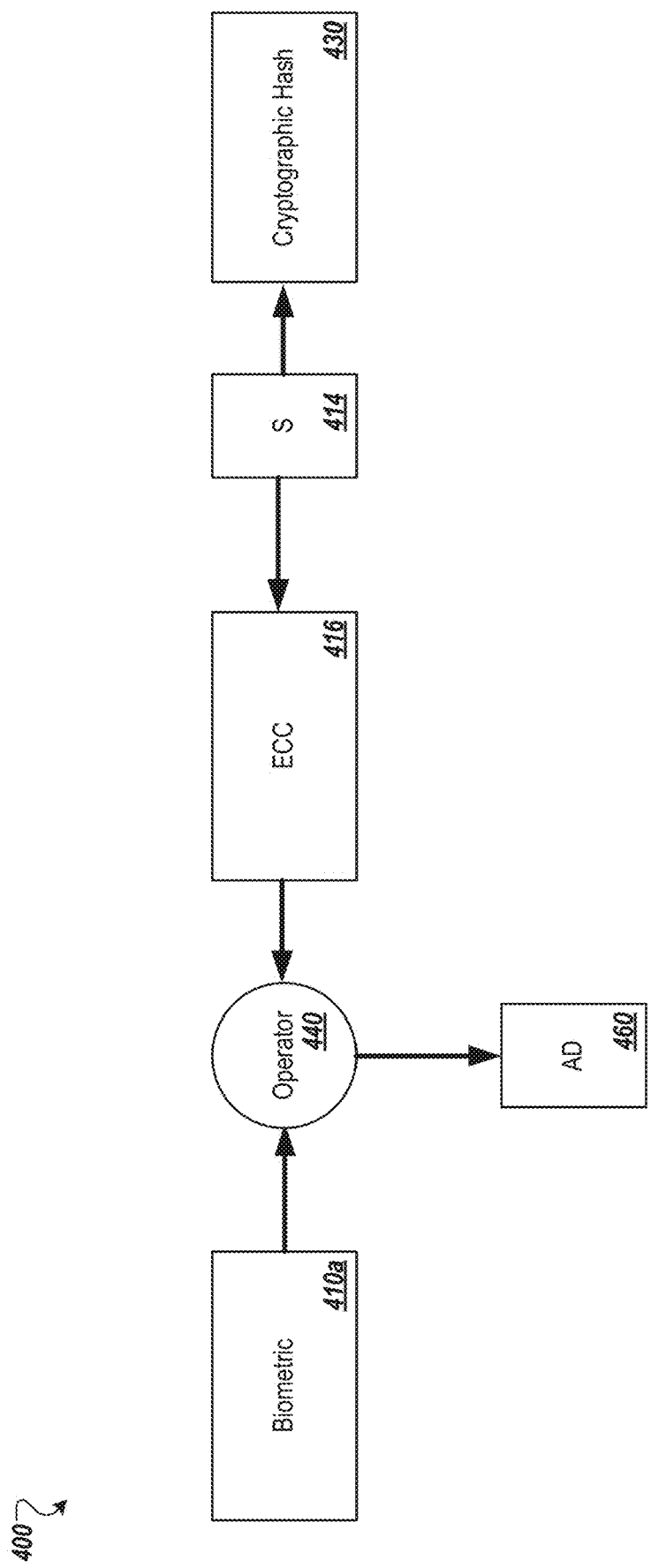
FIG. 4 illustrates an example block diagram for combining a biometric source with a secret codeword to generate a mapping function.

As illustrated in the system 400 in FIG. 4, to generate the S 414 for sources containing errors (e.g., a biometric 410*a*), the S 414 may be protected using an Error Correction Code (ECC) 416 encoder to produce a secret codeword. The sources containing errors (e.g., the biometric 410*a*) may be operated on using an operator 440 (e.g., an XOR operator, an XNOR operator, or the like) to generate a mapping function (e.g., Auxiliary Data (AD) 460). The mapping function (e.g., AD 460) may be stored to facilitate regeneration of S 414. The mapping function (e.g., AD 460) may not reveal any information about the source containing errors (e.g., the biometric 410*a*) or S 414. The mapping function (e.g., AD 460) may provide meaning when the correct source data (e.g., the biometric 410*a*) is provided. S 414 may be a randomly chosen value which may be hashed using a cryptographic hash 430 and passed to the key seed hash function.

User data with errors may be used to generate a key seed. The process for generating the key seed may include one or more of the following: (i) choosing an S 414 (e.g., a large number, a random number, or both), (ii) applying a cryptographic hash to S 414 to generate a hashed secret $S_H$, (iii) applying error correction to S 414 to generate a codeword C, (iv) determine a mapping number M (e.g., AD 460) between the user data with errors (e.g., user supplied data U which may be biometric 410*a*) and codeword C, (v) store the mapping number M (e.g., AD 460) in the user template, or (vi) use the hashed secret $S_H$ as part of the key seed. The hashed secret $S_H$ may be sized to match the size of other key seed numbers. Applying a cryptographic hash may be optional and/or not performed.

Figure 5:
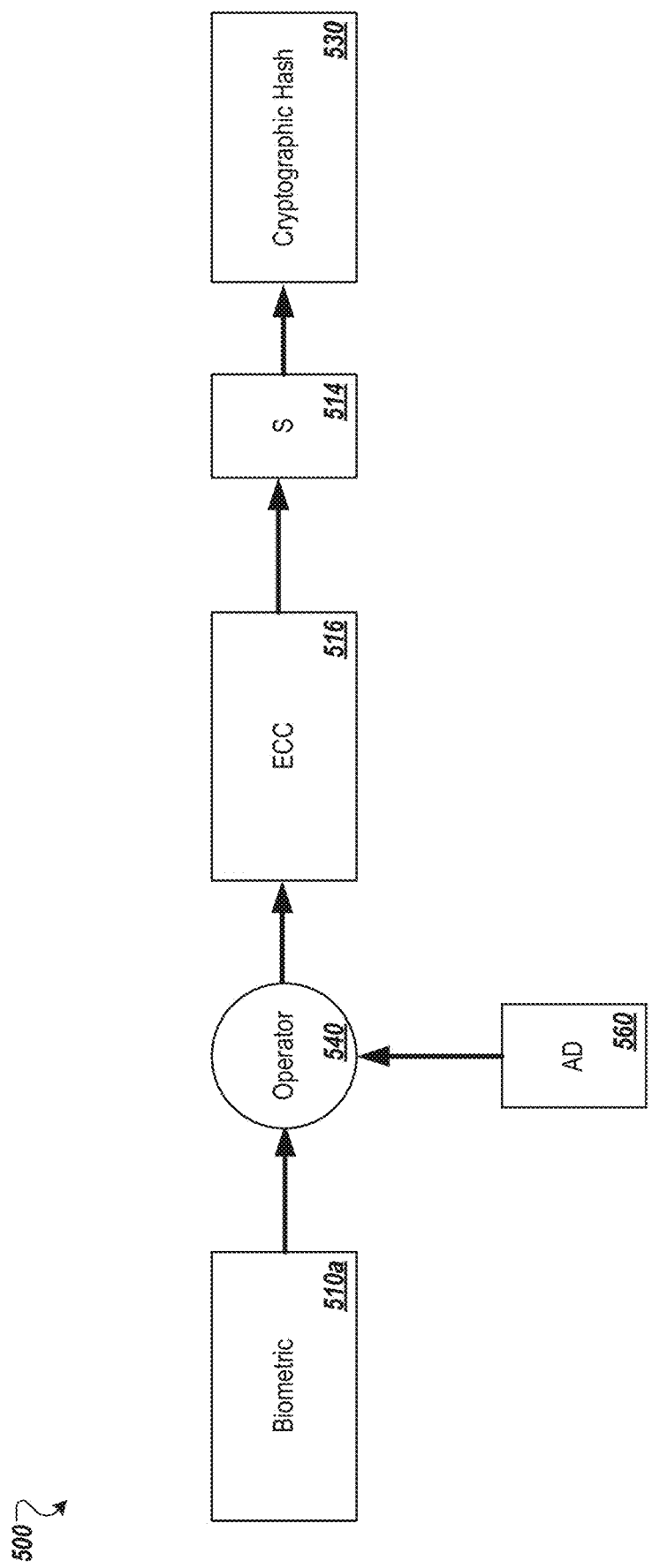
FIG. 5 illustrates an example block diagram for combining a biometric source with a mapping function to regenerate a secret.

As illustrated in the system 500 in FIG. 5, to retrieve the secret S 514 for sources containing errors, sources containing errors (e.g., biometric 510*a*) may be operated on using an operator 540 (e.g., an XOR operator, an XNOR operator, or the like) with the a mapping function (e.g., AD 560) to generate the secret codeword (e.g., a secret having errors). The secret codeword may be processed through the ECC 516 decoder to correct errors caused by the source containing errors (e.g., biometric 510*a*) and generate S 514. S 514 may be passed through the hash function (e.g., using cryptographic hash 530) and passed to the key seed hash function.

User data with errors may be used to regenerate a key seed. The process for regenerating the key seed may include one or more of the following: (i) retrieving a mapping number M (e.g., AD 560) from a user template, (ii) operating on (using the operator 540 which may be XOR, XNOR, or the like) the mapping number M (e.g., AD 560) and the user data with errors (e.g., biometric data 510*a*) to generate an approximate codeword C', (iii) error correct the approximate codeword C' to generate S 514, (iv) applying a cryptographic hash to S 514 to generate a hashed secret $S_H$, (v) use $S_H$ as part of a key seed for regenerating a key.

Figure 6:
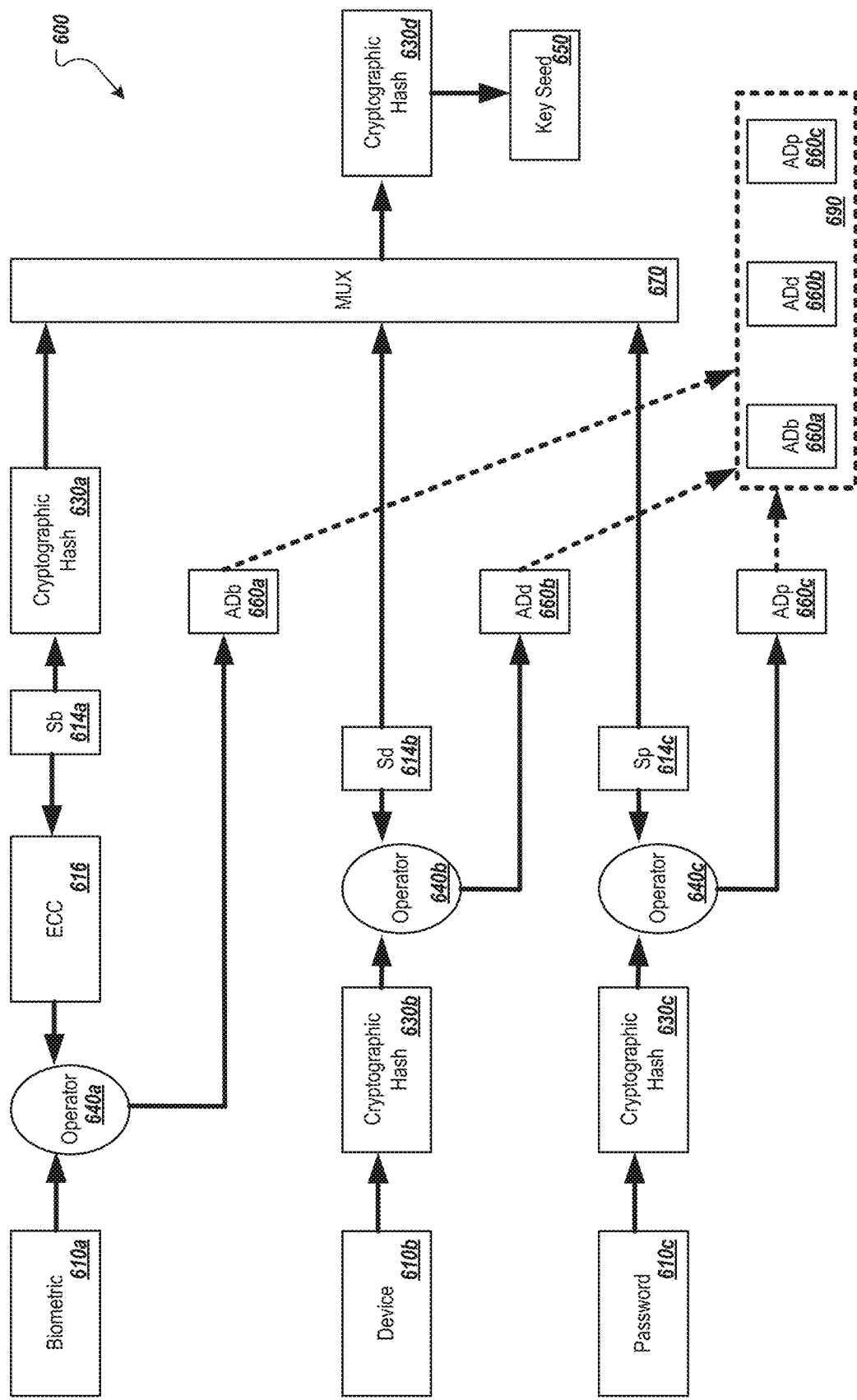
FIG. 6 illustrates an example block diagram for generating a mapping function from multiple factors.

As illustrated in the system 600 in FIG. 6, a key seed 650 may be generated from a combination of error-free sources (e.g., device 610*b*, password 610*c*, or the like) and error-containing sources (e.g., biometric 610*a*).

A secret for an error-containing source (e.g., biometric secret ($S_b$) 614*a*) may be processed by an ECC 616 encoder to generate a secret codeword which may be passed to an operator 640a. An error-containing source (e.g., biometric 610a) may be passed to the operator 640a. The secret for the error-containing source (e.g., biometric secret $S_b$ 614a) and the error-containing source (e.g., biometric 610a) may be operated on by the operator 640a. The operator 640a may be any suitable operator such as an XOR operator, an XNOR operator, or the like. The result from the operator 640a may be a biometric mapping function (e.g., biometric auxiliary data ($AD_b$ 660a)) which may be stored as $AD_b$ 660a in memory 690. The secret for the error-containing source (e.g., biometric secret $S_b$ 614a) may be hashed using a cryptographic hash 630a to be combined with cryptographic hashes of one or more other secrets for error-containing sources or combined with one or more secrets for error-free sources (e.g., a device secret Sa 614b, a password secret $S_p$ 614c, or the like).

An error-free secret (e.g., a device secret $D_s$ 614b) may be passed to an operator 640b. An error-free source (e.g., device 610b) may be hashed using a cryptographic hash 630b and passed to the operator 640b. The operator 640b may be any suitable operator such as an XOR operator, XNOR operator, or the like. The result from the operator 640b may be a device mapping function (e.g., device auxiliary data ($AD_d$ 660b)) which may be stored as $AD_d$ 660b in memory 690. The error-free secret (e.g., device secret Sd $614_b$) may be combined with one or more secrets for error-free sources (e.g., another device secret, a password secret $S_p$ 614c, or the like) or one or more cryptographic hashes 630a of secrets for error-containing sources.

Similarly, an error-free secret (e.g., a password secret $D_p$ 614c) may be passed to an operator 640c. An error-free source (e.g., password 610c) may be hashed using a cryptographic hash 630c and passed to the operator 640c. The operator 640c may be any suitable operator such as an XOR operator, XNOR operator, or the like. The result from the operator 640c may be a device mapping function (e.g., device auxiliary data ($AD_p$ 660c)) which may be stored as $AD_p$ 660c in memory 690. The error-free secret (e.g., password secret Sd $614_b$) may be combined with one or more secrets for error-free sources (e.g., another password secret, a device secret $S_d$ 614b, or the like) or one or more cryptographic hashes 630a of secrets for error-containing sources.

The cryptographic hash of the error-containing sources may be combined with the error-free sources. For example, the cryptographic hash 630a, the device secret $S_d$ 614b, and the password secret $S_p$ 614c may be combined and/or multiplexed (e.g., using mux 670) as input to the cryptographic hash 630d. The cryptographic hash 630d may be used to generate a key seed 650.

The secrets (e.g., $S_b$ 614a, Sa 614b, $S_p$ 614c) may be randomly selected or may be unlocked from previous enrollments. The keys that are generated and regenerated are not stored. The mapping functions (e.g., auxiliary data (e.g., $AD_b$ 660a, $AD_d$ 660e, $AD_p$ 660f)) may be stored in memory 690. While three factors are illustrated, any number of factors may be implemented for any combination of error-free sources and sources with errors.

Figure 7:
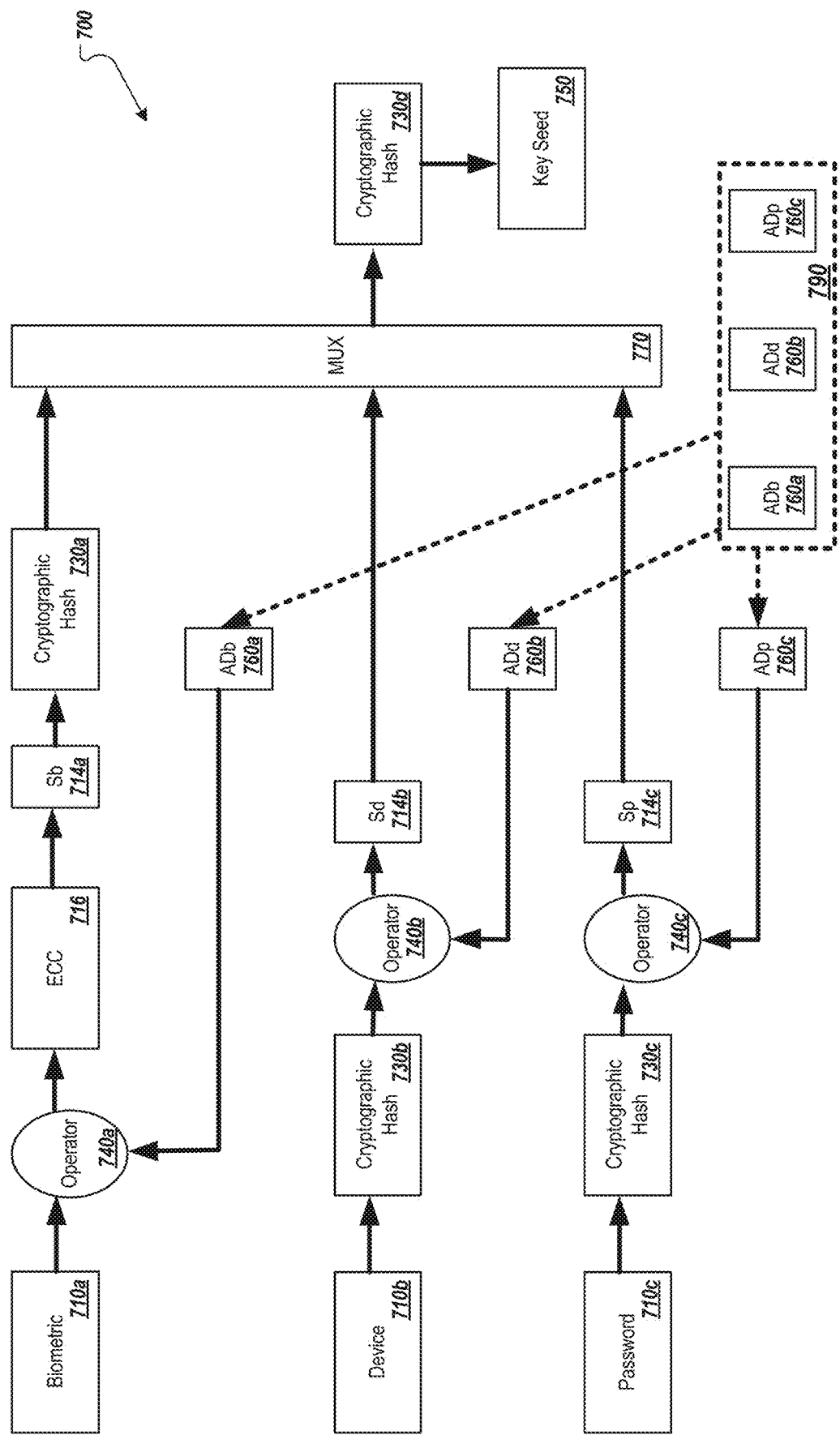
FIG. 7 illustrates an example block diagram for regenerating a key from multiple factors and a mapping function.

As illustrated in the system 700 in FIG. 7, a key seed 750 may be regenerated from a combination of sources (i.e., error-free sources and/or error-containing sources) and mapping functions (e.g., auxiliary data (e.g., ADb 760a, ADd 760b, ADp 760c)). The mapping functions (e.g., auxiliary data) may be retrieved from memory 790. That is, ADb 760a may be retrieved from memory 790, ADd 760b may be retrieved from memory 790, and ADp 760c may be retrieved from memory 790. The mapping functions (e.g., auxiliary data ADb 760a, ADd 760b, and ADp 760c) may be operated on by the operator 740a, 740b, and 740c, respectively.

For an error-containing source, the mapping functions (e.g., auxiliary data 760a) may be operated on by the operator with the error containing source (e.g., biometric 710a) to generate a secret codeword. The secret codeword may be processed through the ECC 716 decoder, which may correct errors caused by the source containing errors (e.g., biometric 710a) to generate $S_b$ 714a. $S_b$ 714a may be passed to a cryptographic hash function which may hash $S_b$ 714a and pass the hashed $S_p$ to the multiplexer 770.

For an error-free source, a cryptographic hash 730b, 730c may hash the error-free source (e.g., device 710b or password 710c) and, when operated on by the operator 740b, 740c with the mapping function (e.g., auxiliary data $AD_d$ 760b, $AD_p$ 760p), may generate secrets $S_d$ 714b, $S_p$ 714c. The secrets $S_d$ 714b, $S_p$ 714c may be passed to the multiplexer 770.

The secrets from error-containing sources (e.g., $S_b$ 714a) or from error-free sources (e.g., $S_d$ 714b, $S_p$ 714c) may be multiplexed using the multiplexer. Alternatively or in addition, the secrets from error-containing sources (e.g., $S_b$ 714a) or from error-free sources (e.g., $S_d$ 714b, $S_p$ 714c) may be combined. The resulting combination of secrets (e.g., $S_b$ 714a, $S_d$ 714b, $S_p$ 714c) may be hashed using cryptographic hash 730d to generate a key seed 750.

Updating one or more of the biometric, the device, or the password may cause an update to the system 700. Changing any of the factors, (e.g., device 710b, biometric 710a, or password 710c) may cause a regeneration of the secrets $S_b$ 714a, $S_d$ 714b, $S_p$ 714c by performing a verification with the matching device, biometric, or password. Then, a new device, biometric, and/or password may be used to bind to the same secrets $S_b$ 714a, $S_d$ 714b, $S_p$ 714c. In this example, the mapping function (e.g., AD 760a, 760b, 760c) may change to match the new factor, but the secrets S $S_b$ 714a, $S_d$ 714b, $S_p$ 714c and keys (and/or key seeds 750) may remain unchanged.

Figure 8:
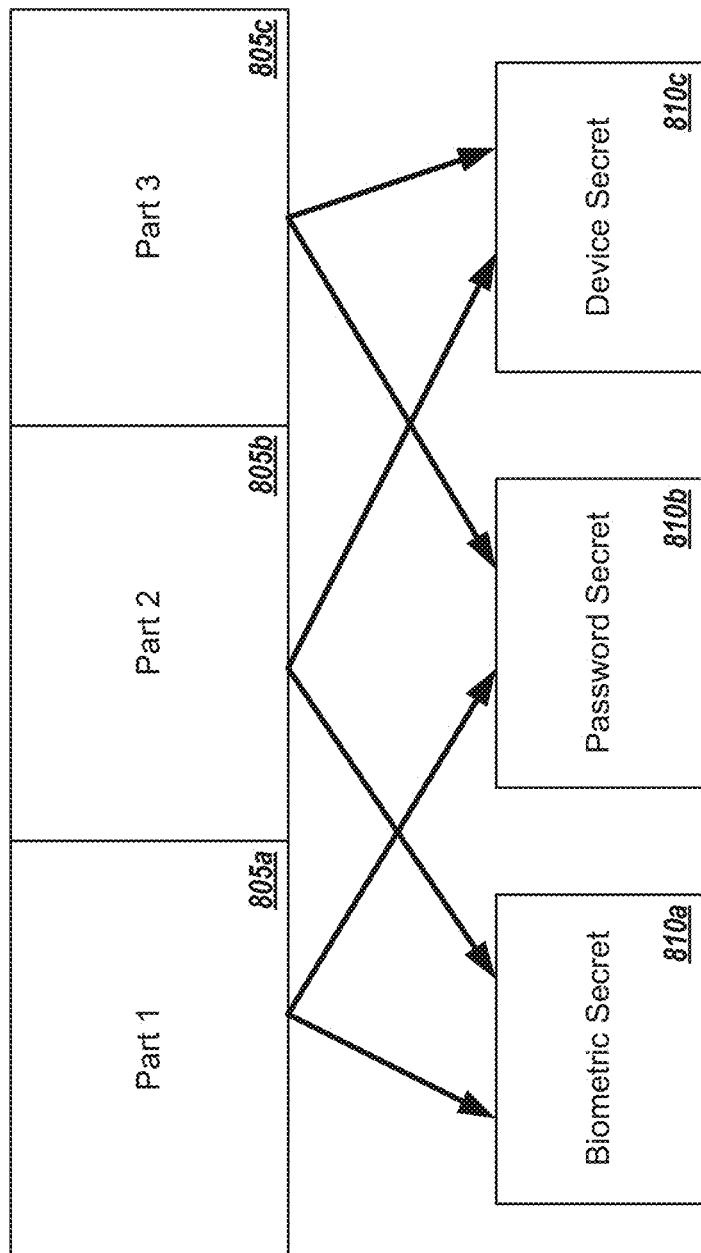
FIG. 8 illustrates an example block diagram for key recovery.

As illustrated in the system 800 in FIG. 8, a recovery key may be created. For example, one or more of the factors (e.g., biometric, device, or password) may be missing e.g., when the password is forgotten, the device is damaged or lost, or the biometric is injured. To generate a recovery key, secrets (e.g., biometric secret 810a, password secret 810b, device secret 810c) may be created using overlap so that it is possible to generate a recovery key when some but not all of the factors (e.g., biometric, device, or password) are missing. For example, when three factors are used, a recovery key may be generated when 2 of the 3 factors are available.

To generate a recovery key, one or more recovery mapping functions (e.g., recovery AD) may be generated. A recovery mapping function (e.g., recovery AD ($AD_r$)) may be a combination of secrets. For a scenario in which a biometric, a device, and a password are used and have a biometric secret $S_b$ 810a, a password secret $S_p$ 810b, and a device secret $S_d$ 810c, respectively, the recovery mapping function (e.g., recovery AD) may be expressed as: $AD_r = S_p \hat{\ } S_d \hat{\ } S_b$, where ˆ indicates an operator such as the XOR operator or the XNOR operator.

For this scenario, the recovery mapping function (e.g., recovery AD) may be used to recover a secret when two secrets are known. For example, when the password secret is lost: $S_p = AD_r \hat{\ } S_d \hat{\ } S_b$. That is, the password secret may be generated by operating on the recovery mapping function (e.g., recovery AD), the device secret $S_a$ 810c, and the biometric secret $S_b$ 810a. When the device secret is lost: $S_d = AD_r \hat{} S_p \hat{} S_b$.

That is, the device secret may be generated by operating on the recovery mapping function (e.g., recovery AD), the password secret $S_p$ 810b, and the biometric secret $S_b$ 810a. When the biometric secret is lost: $S_b = AD_r \hat{} S_p \hat{} S_d$. That is, the biometric secret may be generated by operating on the recovery mapping function (e.g., recovery AD), the password secret $S_p$ 810b, and the device secret $S_d$ 810c. In some examples, the recovery mapping function (e.g., recovery AD) may be stored separately from the other auxiliary data (e.g., biometric auxiliary data, device auxiliary data, password auxiliary data, or other factor auxiliary data). In some examples, the recovery mapping function (e.g., recovery AD) may be accessed when recovery is to be effectuated.

A method for generating a recovery key may include one or more of: (i) generate the one or more user data key seed contributions (e.g., secrets $S_1, S_2, \ldots, S_N$), (ii) create a mapping number M (e.g., auxiliary data) between the one or more data key seed contributions (e.g., secrets $S_1, S_2, \ldots, S_N$) by computing an operation on the one or more data key seed contributions (e.g., secrets $S_1, S_2, \ldots, S_N$), or (iii) storing the mapping number (e.g., auxiliary data) to generate the recovery key.

In some scenarios, it may be useful to recover a lost secret from a known secret. A method for recovering a lost secret from a known secret may include one or more of: (i) generate the one or more known user data key seed contributions (e.g., secrets $S_1, S_2, \ldots, S_N$ excluding $S_u$), (ii) retrieve the mapping number (e.g., auxiliary data), and (iii) performing an operation on the known user data key seed contributions (e.g., secrets $S_1, S_2, \ldots, S_N$ excluding $S_u$) and the mapping number (e.g., auxiliary data) to generate the lost user data key seed contribution (e.g., the lost secret $S_u$).

An example method may include importing a key seed from an existing key and distributing the imported key seed in a specific way to the individual seeds so that these secrets recreate the existing key. In examples where sources with errors are using a cryptographic hash, or if the key seed is created from a cryptographic hash of the individual secrets, an additional key seed mapping function (e.g., AD) may be generated. The additional key seed mapping function (e.g., AD) may map the key seed created by the multi-factor process to the key seed used by the existing key, i.e. mapping at the end of the key seed process avoids issues with reversing hashes and makes mapping generally less complicated. This mapping between two random numbers may be performed without revealing information about either number, and instead, just the relative nature of the two random numbers, i.e. key seeds.

Figure 9:
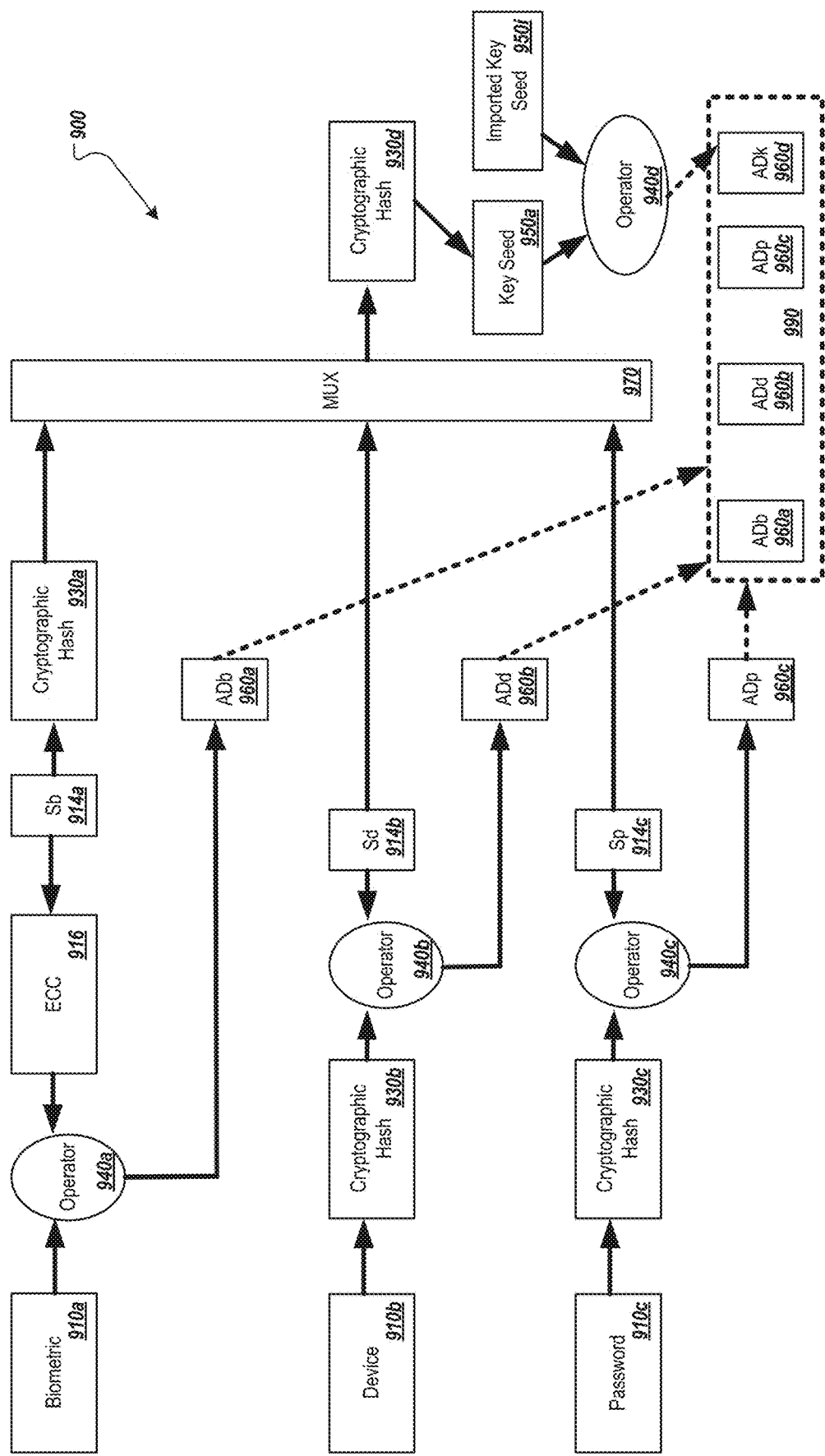
FIG. 9 illustrates an example block diagram for importing a key.

As illustrated in the system 900 in FIG. 9, a key seed may be imported and combined with an existing key seed. In this system 900, numerous factors (e.g., error-containing factors such as biometric 910a or error-free factors such as device 910b or password 910c) may be processed. For example, an error containing factor (e.g., biometric 910a) and a secret codeword (which may be obtained from a secret $S_b$ 914a which has been corrected by an ECC 916) may be operated on by an operator 940a to generate a mapping function (e.g., auxiliary data $AD_b$ 960a). In addition or alternatively, error-free factors (e.g., device 910b and/or password 910c) may be hashed using a cryptographic hash 930b, 930c. The resulting hash and a secret (e.g., $S_d$ 914b or $S_p$ 914c) may be operated on by an operator 940b, 940c to generate a mapping function (e.g., auxiliary data 960b, 960c). The mapping function (e.g., auxiliary data 960a, 960b, 960c) may be stored in a memory 990 for retrieval. Cryptographic hashes of the secrets (e.g., 930a) or the secrets (e.g., e.g., $S_d$ 914b or $S_p$ 914c) may be combined. In one example, the cryptographic hashes of the secrets (e.g., 930a) or the secrets (e.g., e.g., $S_d$ 914b or $S_p$ 914c) may be combined using a multiplexor 970.

In this system 900, the combined and/or multiplexed secrets (which may be cryptographically hashed previously) may be hashed using cryptographic hash 930d to generate a key seed 950a. The key seed 950a and an imported key seed 950i may be operated on by an operator (which may be an XOR operator, an XNOR operator, or the like) to generate a mapping function (e.g., auxiliary data $AD_k$ 960d). The mapping function (e.g., auxiliary data ADk) may be used for regeneration of the imported key seed 950i.

Figure 10:
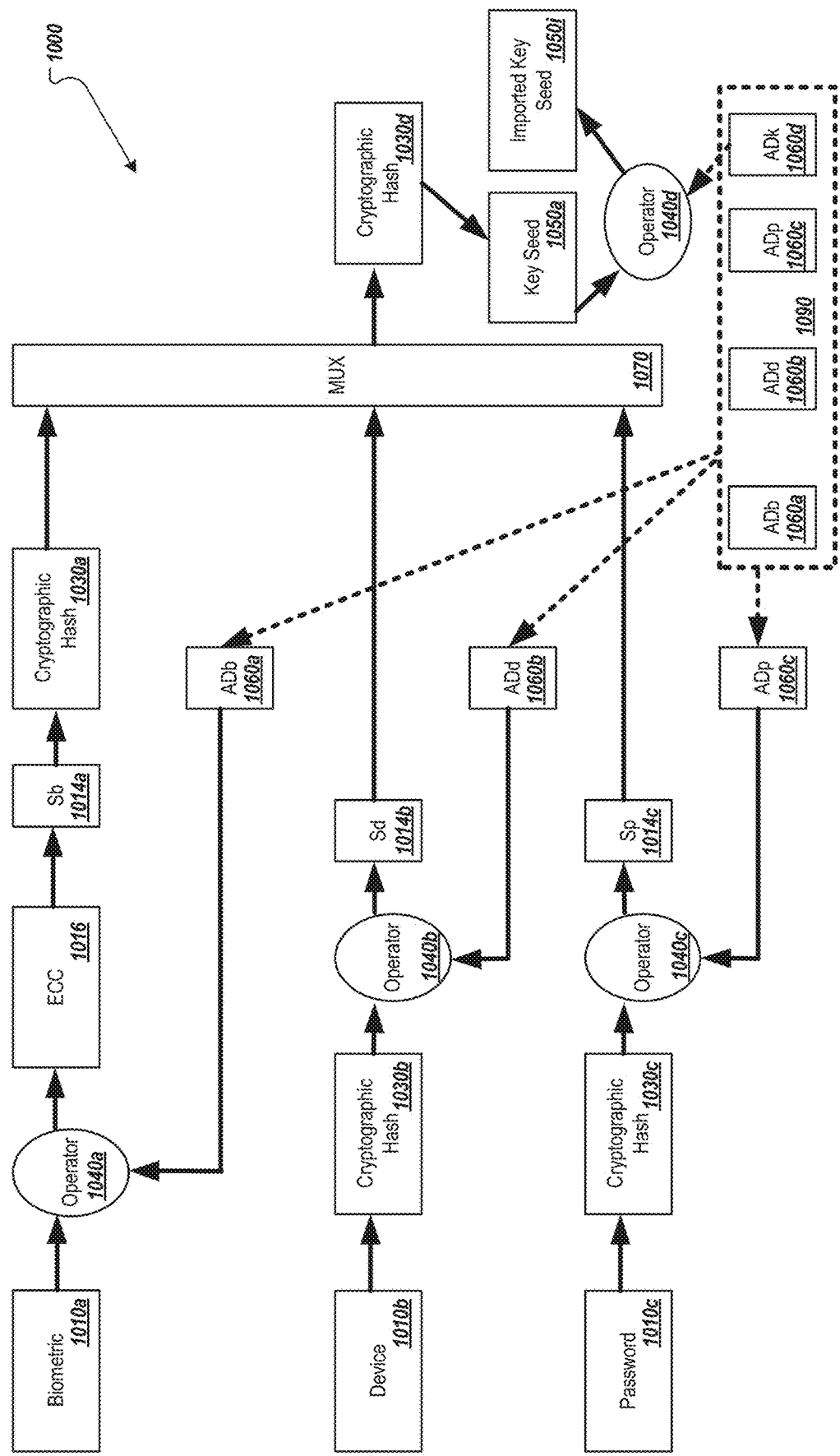
FIG. 10 illustrates an example block diagram for regenerating an imported key seed.

As illustrated in the system 1000 in FIG. 10, an imported key seed 1050i may be regenerated. To regenerate the imported key seed 1050i, a biometric 1010a and a mapping function (e.g., auxiliary data $AD_b$ 1060a) may be operated on using an operator 1040a to form a secret codeword which may be decoded by an ECC decoder 1016 to regenerate a secret $S_b$ 1014a. The secret $S_b$ 1014a may be hashed using a cryptographic hash 1030a and combined with other secrets e.g., using a multiplexer 1070. A device 1010b and a password 1010c may be hashed using cryptographic hashes 1030b, 1030c and operated on using operators 1040b, 1040c when combined with a mapping function (e.g., auxiliary data $AD_d$ 1060b, $AD_p$ 1060c) to regenerate secrets $S_d$ 1014b, $S_p$ 1014c. The mapping function (e.g., auxiliary data) may be retrieved from memory 1090.

The output of the combination and/or multiplexing of the secrets $S_d$ 1014b and $S_p$ 1014c and the cryptographic hash 1030a of secret $S_b$ 1014a may be sent to a cryptographic hash 1030d to regenerate the key seed 1050a. The key seed 1050a and the mapping function (e.g., auxiliary data $AD_k$ 1060d) may be operated on using operator 1040d to regenerate the imported key seed 1050i. Although an imported key seed 1050i was illustrated, the mapping function (auxiliary data $AD_k$ 1060d) may be used to map between private keys. Alternatively or in addition, the mapping function (e.g., auxiliary data $AD_k$) 1060d may be used to map between symmetric keys.

This same system 900, 1000 may be used to allow a single multi-factor key seed to be mapped to any number of additional independent keys. For example, the multi-factor key could be used to recreate different keys for different websites, different bank accounts, different crypto wallets, or so forth. In some examples, a user may have the same biometric, device, and password, but different keys may be generated in different circumstances.

A method for generating a multi-factor key from an existing external key may include one or more of: (i) retrieving a mapping number M (e.g., the AD) from the user template, (ii) calculating user secrets $S_1, S_2, \ldots S_N$ from user data $U_1, U_2, \ldots U_N$, (iii) converting user secrets $S_1, S_2, \ldots S_N$ into a corresponding key seed $K_s$, (iv) calculating a $K_w$ from an operation (e.g., XOR or XNOR) between M (e.g., the AD) and $K_s$, and (v) using $K_w$ to create the multi-factor key. Alternatively or in addition, the method may be used to recreate the imported key for all subsequent key regenerations.

Creating a multi-factor key from an existing crypto key may be an example of multi-factor key regeneration. Existing crypto keys may be exported using keywords for the purpose of backing up keys or transferring keys between devices or providers. A key seed may be represented by 12 or 24 keywords from a list of 2048 possible keywords (Bitcoin Improvement Proposal (BIP)-0039). These keywords may provide 12*11=132 bits or 24*11=264 bits (or any number of bits) of seed entropy for the key. For example, the 12 key words may be: 'ability,' 'brisk,' 'casino,' 'couch,' 'delay,' 'era,' 'few,' 'kite,' 'margin,' 'point,' 'return,' and 'short.' These 12 words may represent a key seed. This key seed may be used in the event that a crypto wallet fails. These 12 words may be converted into a corresponding key seed $K_w$.

The combination of a password secret $S_p$, a device secret $S_a$, and a biometric secret St may be used to create 132 bits or 264 bits (or any number of bits) of seed entropy for the key which may be used to create a key seed $K_s$. The mapping between $K_w$ and $K_s$ may be stored as an additional mapping function (e.g., $AD_k$). The secrets may be regenerated as described with respect to system 900 and 1000 to create the key seed $K_s$. The key seed $K_s$ may be converted to the key seed of the original crypto key $K_w$ using a mapping function (e.g., $AD_k$). Keywords (e.g., 'ability,' 'brisk,' 'casino,' 'couch,' 'delay,' 'era,' 'few,' 'kite,' 'margin,' 'point,' 'return,' and 'short') may be recreated, using Kw, for export to external hardware or software wallets.

Therefore, a method for generating a multi-factor key from an existing external key may include one or more of: (i) retrieving keywords (e.g., 12 or 24 keywords) that represent the existing key, (ii) converting the keywords into a corresponding key seed $K_w$, (iii) calculating user secrets $S_1, S_2, \ldots S_N$ (e.g., biometric secrets, device secrets, password secrets) from user data $U_1, U_2, \ldots U_N$ (e.g., biometric data, device data, or password data), (iv) converting user secrets $S_1, S_2, \ldots S_N$ into a corresponding key seed $K_s$ (e.g., as illustrated in FIGS. 9 and 10), or (v) determining a mapping number (e.g., AD) between $K_w$ and $K_s$. The method may also include storing the mapping number (e.g., AD) in the user template.

Therefore an existing key, such as a key that corresponds to an existing software or hardware crypto wallet, may be converted to a multi-factor key for use with an application that uses a cryptographic key, bank account, web site, or the like. There are other use cases that are also possible, such as: (i) alternative key device backup (e.g., when a device is damaged), (ii) temporary access to a third party (e.g., rental car, short term vacation rental, or the like), (iii) adding an authorized device to a user account, (iv) changing a password associated with the key, (v) changing a biometric associated with the key (e.g., due to aging, injury, or the like), (vi) updating a biometric to be a different biometric (e.g., using a facial biometric instead of a hand biometric), or (vii) updating a biometric algorithm (e.g., new vendor or new version).

For example, a first source may be updated by binding an updated first source to a first secret. The method may include one or more of: (i) receiving and hashing a second instance of first data from a first source to generate a second instance of first hashed data, (ii) applying a first mapping function (e.g., AD) to the second instance of first hashed data to generate a second instance of a first secret, (iii) receiving and hashing a first instance of second data from a second source to generate a first instance of second hashed data in which the first instance of the second data from the second source may be discarded, (iv) computing a second mapping function between the first instance of the second hashed data and the second instance of the first secret in which the second mapping function is stored and the first instance of the second hashed data and the second instance of the first secret are discarded.

Joint key ownership may also be provided. For example, joint owners may have access to the same multi-factor key in which each joint owner has their own biometric, their own password, and their own device. In this situation, a first owner may enroll and bind the secrets (e.g., biometric secret, password secret, and device secret). Additional owners may be added by regenerating the secrets and binding the regenerated secrets using their own biometric, their own password, and their own device.

Transfer of a key may also be provided. A key owner may transfer the key to a different owner by recreating the secrets and having the different owner bind to the secrets using the same device but a different password and biometric.

Revocation of a key may also be provided. For example, a key may be a public key that may be registered with a public directory. When the key has been compromised (e.g., hacked), a new key may be generated using the same biometric. A method for generating the new key (e.g., a new public key) may include re-enrolling the same biometric with a new set of secrets. Alternatively or in addition, the sources (e.g., biometric, password, device) may be the same and a new set of secrets may be provided.

The process for creating new secrets may include one or more of: (i) identifying a first instance of a first secret; (ii) receiving and hashing a first instance of first data from a first source to generate a first instance of first hashed data, wherein the first instance of the first data from the first source is discarded; (iii) computing a first mapping function between the first instance of the first hashed data and the first instance of the first secret, wherein the first mapping function is stored and the first instance of the first hashed data and the first instance of the first secret are discarded. The process may be repeated until the one or more secrets have been created. The secrets may be used to generate a key which may be a public key. The public key may be published. A private key may also be generated.

Revocation of a user template may also be provided. A method for generating a new template may include a similar process to revoking a public key and creating a new public key.

Figure 11:
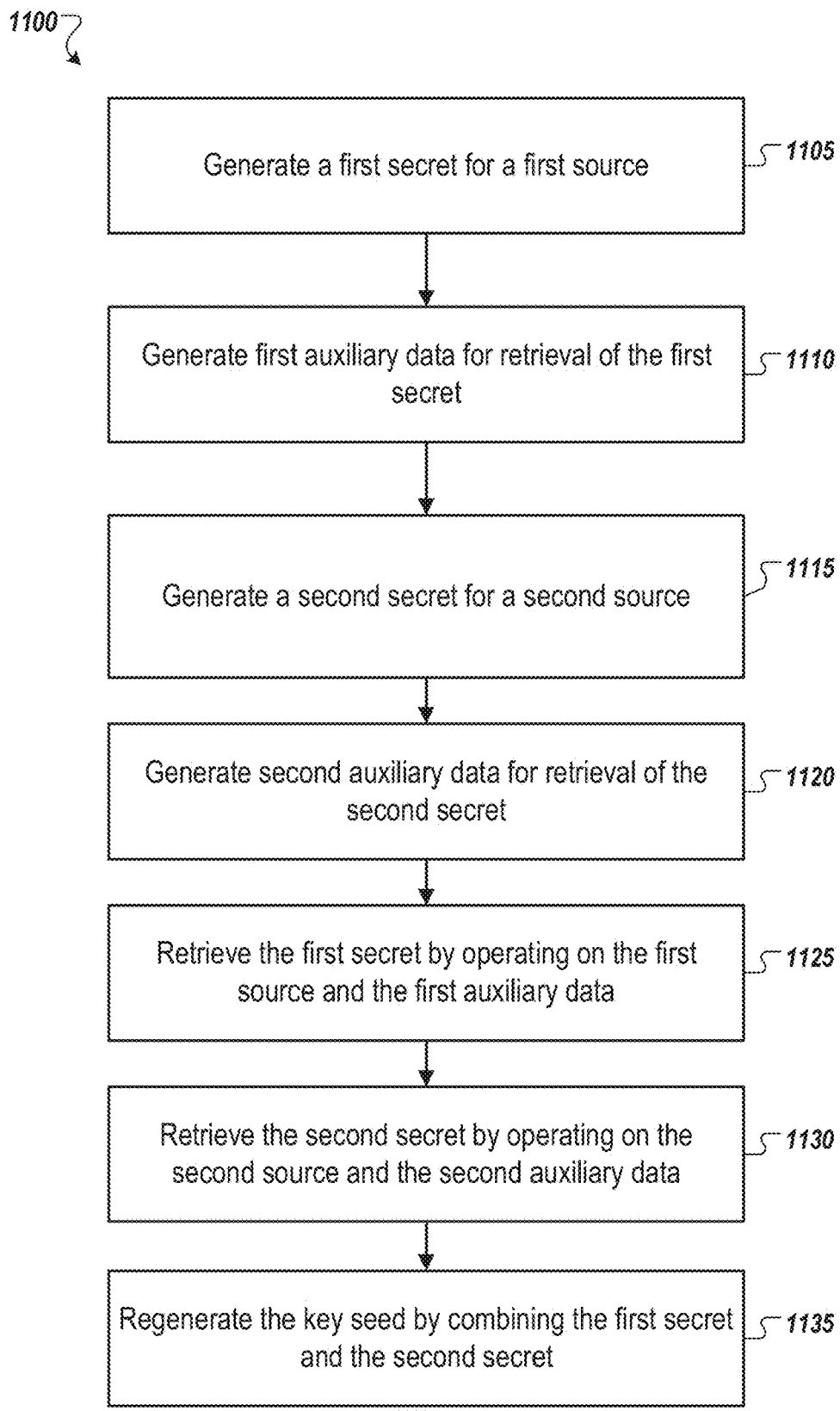
FIG. 11 illustrates a process flow for authentication and key regeneration in accordance with an example.

FIG. 11 illustrates a process flow of an example method 1100 of multifactor authentication and key regeneration in accordance with at least one example described in the present disclosure. The method 1100 may be arranged in accordance with at least one example described in the present disclosure.

Figure 22:
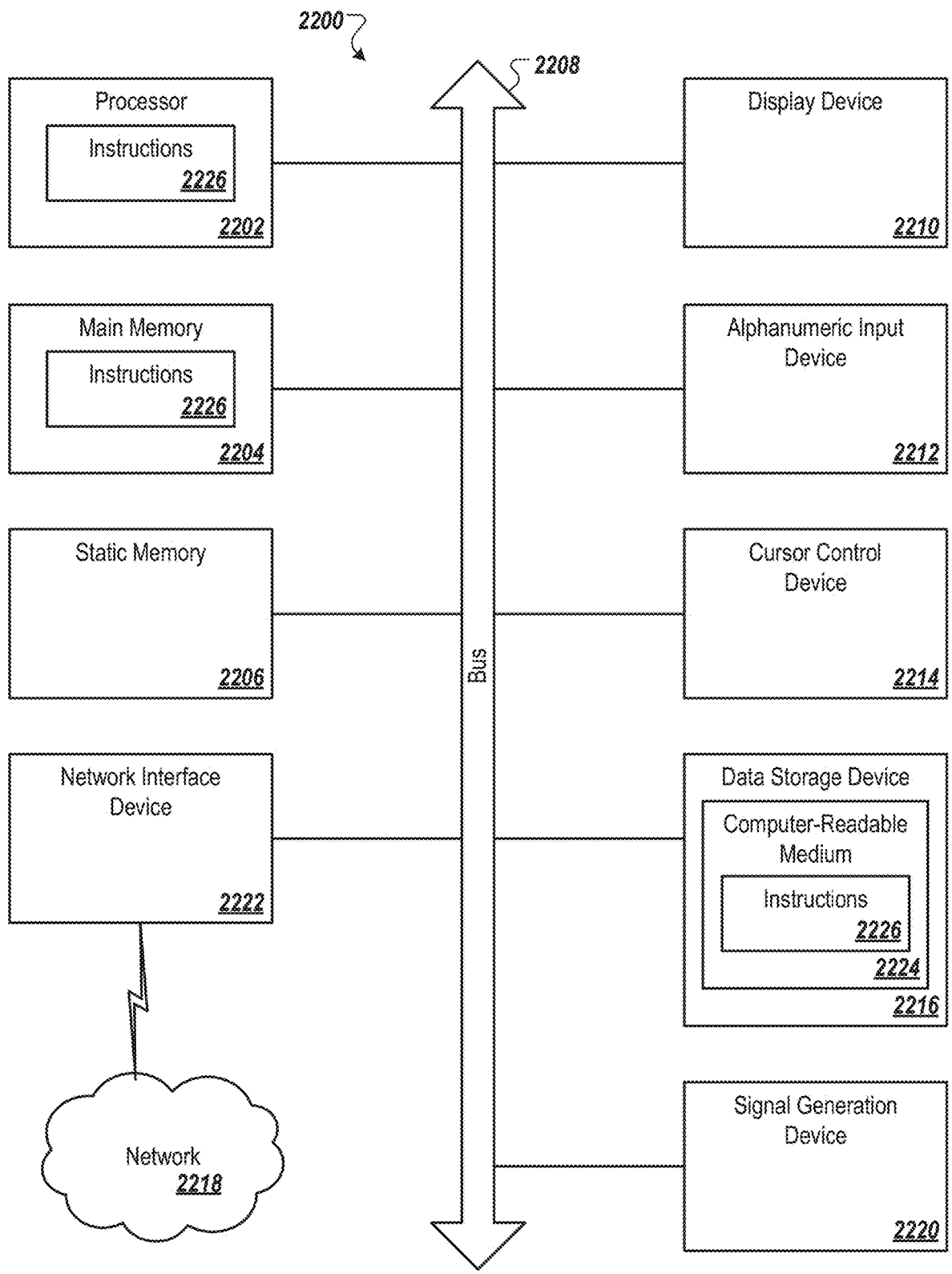
FIG. 22 illustrates a diagrammatic representation of a machine in the example form of a computing device within which a set of instructions, for causing the machine to perform any one or more of the methods discussed herein, may be executed.

The method 1100 may be performed by processing logic that may include hardware (circuitry, dedicated logic, etc.), software (such as is run on a computer system or a dedicated machine), or a combination of both, which processing logic may be included in the processing device 2202 of FIG. 22, or another device, combination of devices, or systems.

The method 1100 may begin at block 1105 where the processing logic may include generating a first secret for a first source.

At block 1110, the processing logic may include generating a first mapping function (e.g., auxiliary data) for retrieval of the first secret.

At block 1115, the processing logic may include generating a second secret for a second source.

At block 1120, the processing logic may include generating second mapping function (e.g., auxiliary data) for retrieval of the second secret. The first secret and the second secret may not be stored.

At block 1125, the processing logic may include retrieving the first secret by operating on the first source and the first mapping function (e.g., auxiliary data).

At block 1130, the processing logic may include retrieving the second secret by operating on the second source and the second mapping function (e.g., auxiliary data).

At block 1135, the processing logic may include regenerating the key seed by combining the first secret and the second secret.

Modifications, additions, or omissions may be made to the method 1100 without departing from the scope of the present disclosure. For example, in some examples, the method 1100 may include any number of other components that may not be explicitly illustrated or described.

Figure 12:
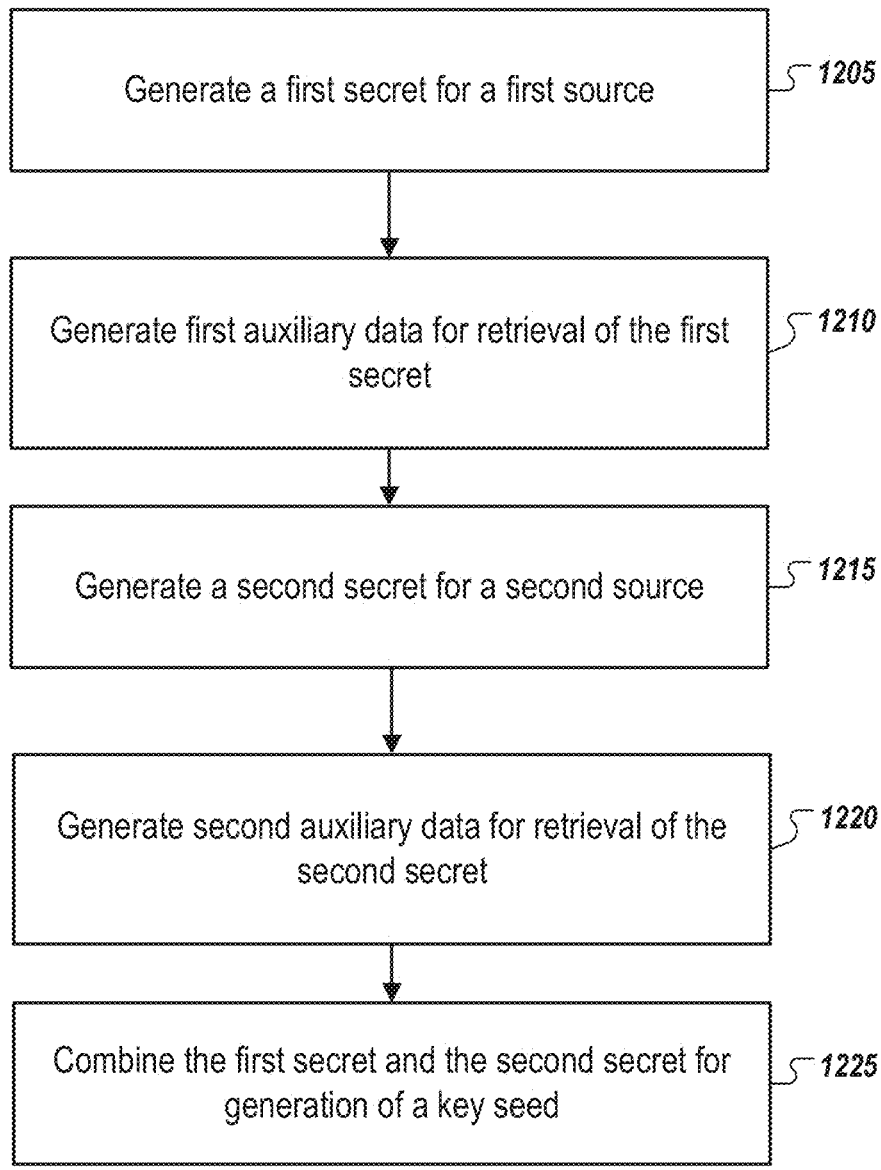
FIG. 12 illustrates a process flow for authentication and key regeneration in accordance with an example.

FIG. 12 illustrates a process flow of an example method 1200 that may be used for multifactor authentication and key regeneration, in accordance with at least one example described in the present disclosure. The method 1200 may be arranged in accordance with at least one example described in the present disclosure.

The method 1200 may be performed by processing logic that may include hardware (circuitry, dedicated logic, etc.), software (such as is run on a computer system or a dedicated machine), or a combination of both, which processing logic may be included in the processing device 2202 of FIG. 22, or another device, combination of devices, or systems.

The method 1200 may begin at block 1205 where the processing logic may include generating a first secret for a first source.

At block 1210, the processing logic may include generating a first mapping function (e.g., auxiliary data) for retrieval of the first secret.

At block 1215, the processing logic may include generating a second secret for a second source.

At block 1220, the processing logic may include generating a second mapping function (e.g., auxiliary data) for retrieval of the second secret.

At block 1225, the processing logic may include combining the first secret and the second secret for generation of a key seed.

Modifications, additions, or omissions may be made to the method 1200 without departing from the scope of the present disclosure. For example, in some examples, the method 1200 may include any number of other components that may not be explicitly illustrated or described.

Figure 13:
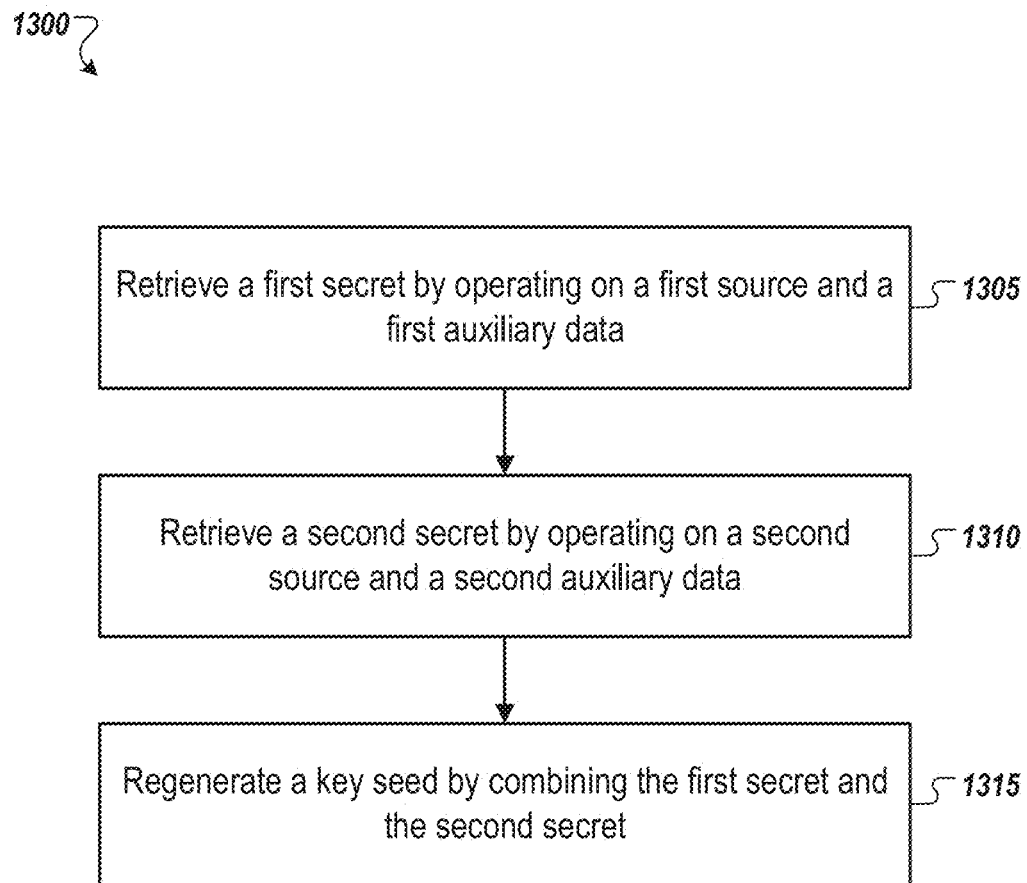
FIG. 13 illustrates a process flow for authentication and key regeneration in accordance with an example.

FIG. 13 illustrates a process flow of an example method 1300 that may be used for multifactor authentication and key regeneration, in accordance with at least one example described in the present disclosure. The method 1300 may be arranged in accordance with at least one example described in the present disclosure.

The method 1300 may be performed by processing logic that may include hardware (circuitry, dedicated logic, etc.), software (such as is run on a computer system or a dedicated machine), or a combination of both, which processing logic may be included in the processing device 2202 of FIG. 22, or another device, combination of devices, or systems.

The method 1300 may begin at block 1305 where the processing logic may include retrieving a first secret by operating on a first source and a first mapping function (e.g., auxiliary data).

At block 1310, the processing logic may include retrieving a second secret by operating on a second source and a second mapping function (e.g., auxiliary data).

At block 1315, the processing logic may include regenerating a key seed by combining the first secret and the second secret.

Modifications, additions, or omissions may be made to the method 1300 without departing from the scope of the present disclosure. For example, in some examples, the method 1300 may include any number of other components that may not be explicitly illustrated or described.

Figure 14:
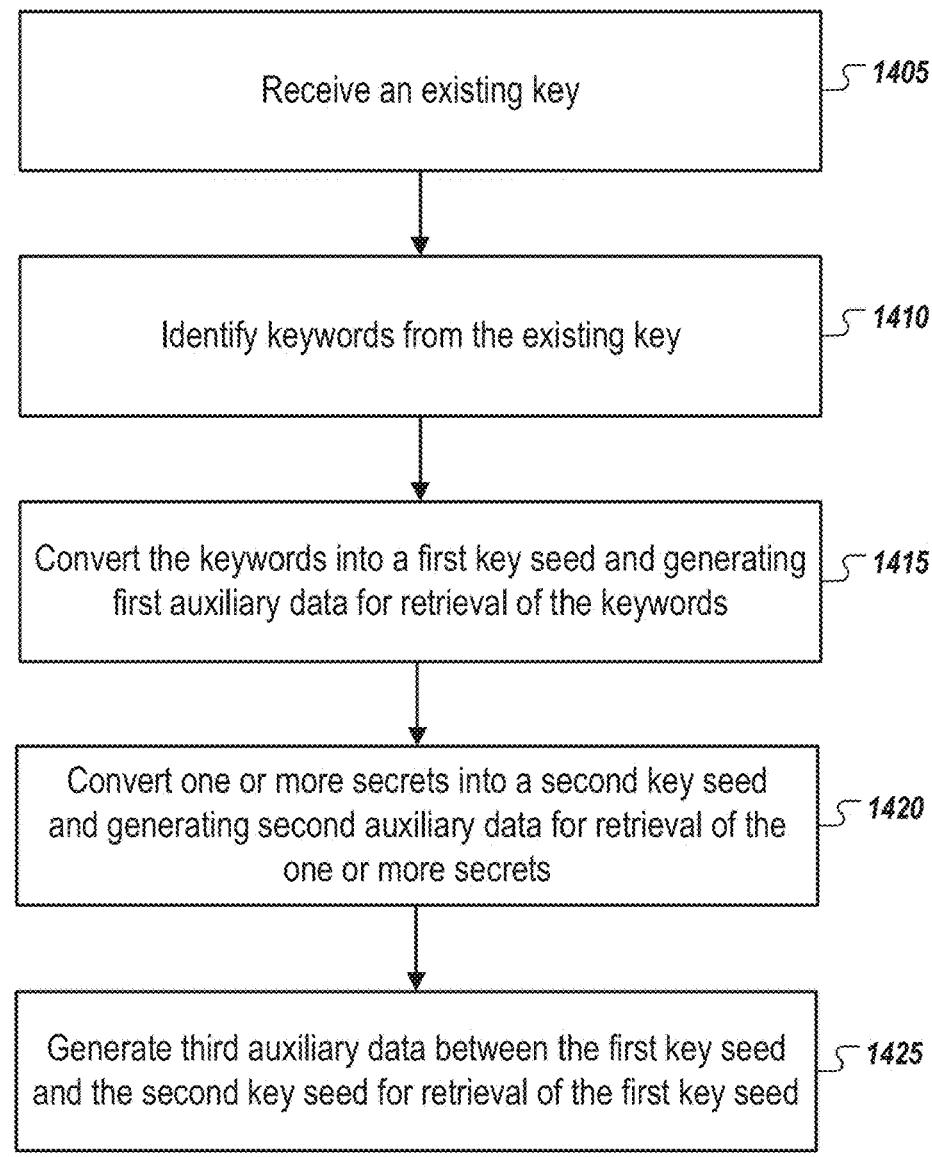
FIG. 14 illustrates a process flow for authentication and key regeneration in accordance with an example.

FIG. 14 illustrates a process flow of an example method 1400 that may be used for multifactor authentication and key regeneration, in accordance with at least one example described in the present disclosure. The method 1400 may be arranged in accordance with at least one example described in the present disclosure.

The method 1400 may be performed by processing logic that may include hardware (circuitry, dedicated logic, etc.), software (such as is run on a computer system or a dedicated machine), or a combination of both, which processing logic may be included in the processing device 2202 of FIG. 22, or another device, combination of devices, or systems.

The method 1400 may begin at block 1405 where the processing logic may include receiving an existing key.

At block 1410, the processing logic may include identifying keywords from the existing key.

At block 1415, the processing logic may include converting the keywords into a first key seed and generating a first mapping function (e.g., auxiliary data) for retrieval of the keywords.

At block 1420, the processing logic may include converting one or more secrets into a second key seed and generating second auxiliary data for retrieval of the one or more secrets.

At block 1425, the processing logic may include generating a third mapping function (e.g., auxiliary data) between the first key seed and the second key seed for retrieval of the first key seed.

Modifications, additions, or omissions may be made to the method 1400 without departing from the scope of the present disclosure. For example, in some examples, the method 1400 may include any number of other components that may not be explicitly illustrated or described.

Figure 15:
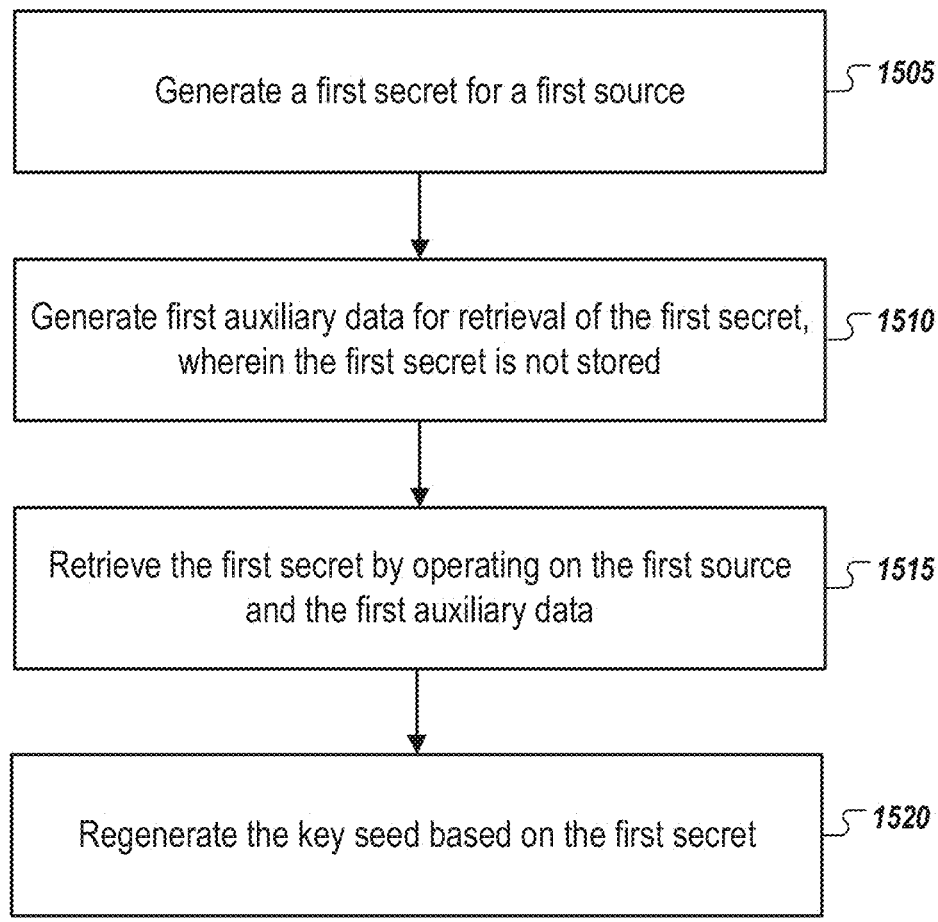
FIG. 15 illustrates a process flow for authentication and key regeneration in accordance with an example.

FIG. 15 illustrates a process flow of an example method 1500 that may be used for authentication and key regeneration, in accordance with at least one example described in the present disclosure. The method 1500 may be arranged in accordance with at least one example described in the present disclosure.

The method 1500 may be performed by processing logic that may include hardware (circuitry, dedicated logic, etc.), software (such as is run on a computer system or a dedicated machine), or a combination of both, which processing logic may be included in the processing device 2202 of FIG. 22, or another device, combination of devices, or systems.

The method 1500 may begin at block 1505 where the processing logic may include generating a first secret for a first source.

At block 1510, the processing logic may include generating a first mapping function (e.g., auxiliary data) for retrieval of the first secret. The first secret may not be stored.

At block 1515, the processing logic may include retrieving the first secret by operating on the first source and the first mapping function (e.g., auxiliary data).

At block 1520, the processing logic may include regenerating the key seed based on the first secret.

In some examples, the first source may be an error-free source. In other examples, the first source may be an error-containing source. When the first source is an error containing source, the method may further include processing the error-containing source using an error correction code to generate a codeword. In some examples, the method may include importing an existing key. When importing an existing key, the existing key may be a key for a cryptographic wallet. In some examples, the first source may be updated by binding an updated first source to the first secret.

In some examples, the method may include one or more of adding a first owner by binding the first owner to the first secret; or adding a second owner by binding the second owner to the first secret.

In some examples, the method may include receiving the first source from a central entity. For example, the central entity may provide the first source when the first source is lost or stolen.

Modifications, additions, or omissions may be made to the method 1500 without departing from the scope of the present disclosure. For example, in some examples, the method 1500 may include any number of other components that may not be explicitly illustrated or described.

Figure 16:
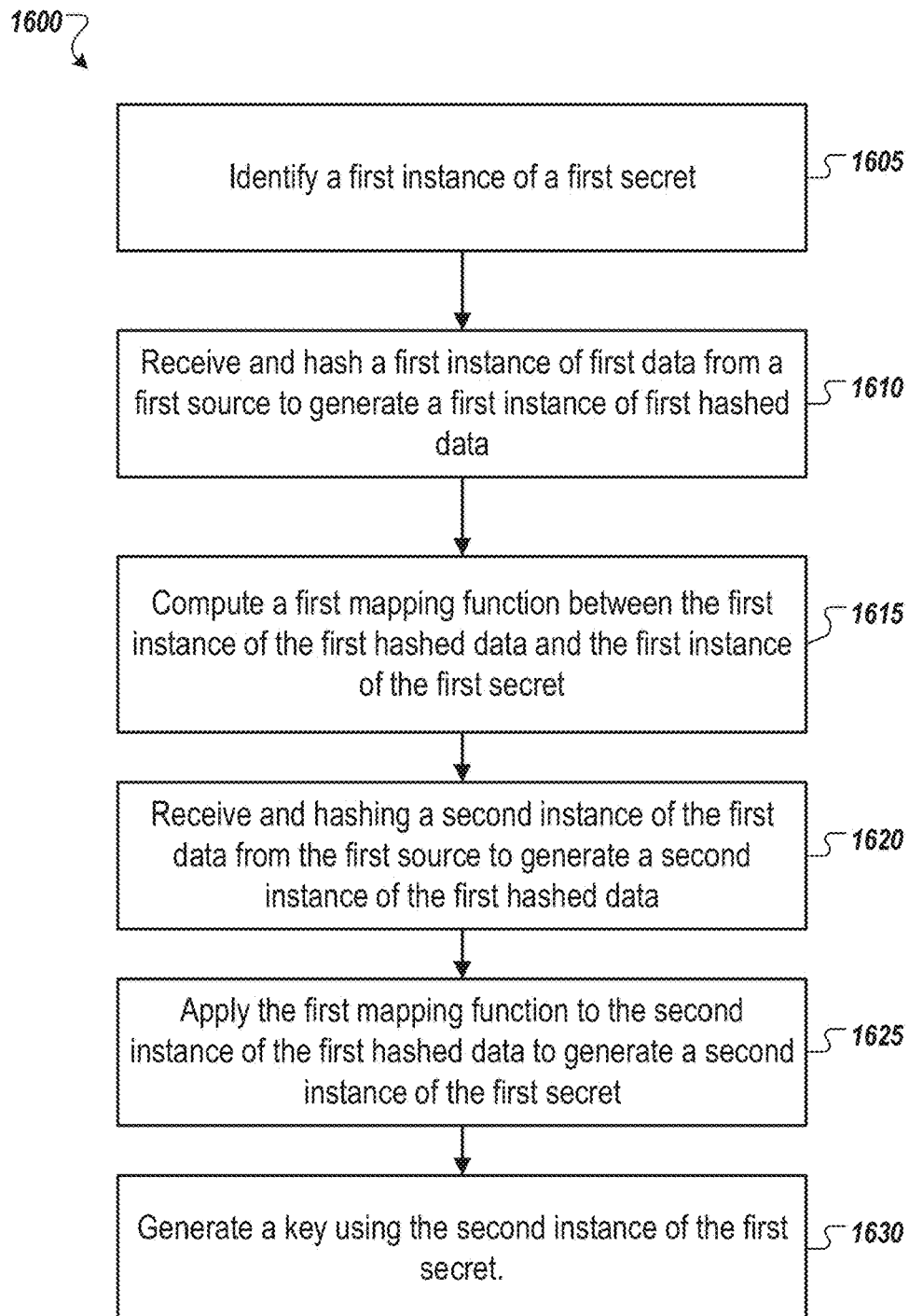
FIG. 16 illustrates a process flow for authentication and key regeneration in accordance with an example.

FIG. 16 illustrates a process flow of an example method 1600 that may be used for authentication and key regeneration, in accordance with at least one example described in the present disclosure. The method 1600 may be arranged in accordance with at least one example described in the present disclosure.

The method 1600 may be performed by processing logic that may include hardware (circuitry, dedicated logic, etc.), software (such as is run on a computer system or a dedicated machine), or a combination of both, which processing logic may be included in the processing device 2202 of FIG. 22, or another device, combination of devices, or systems.

The method 1600 may begin at block 1605 where the processing logic may include identifying a first instance of a first secret.

At block 1610, the processing logic may include receiving and hashing a first instance of first data from a first source to generate a first instance of first hashed data. The first instance of the first data from the first source may be discarded.

At block 1615, the processing logic may include computing a first mapping function between the first instance of the first hashed data and the first instance of the first secret. The first mapping function may be stored and the first instance of the first hashed data and the first instance of the first secret may be discarded.

At block 1620, the processing logic may include receiving and hashing a second instance of the first data from the first source to generate a second instance of the first hashed data.

At block 1625, the processing logic may include applying the first mapping function to the second instance of the first hashed data to generate a second instance of the first secret.

At block 1630, the processing logic may include generating a key using the second instance of the first secret.

In one example, the first source may be an error free source.

In one example, the method may further include: identifying a first instance of a second secret; receiving and hashing a first instance of second data from a second source to generate a first instance of second hashed data, in which the first instance of the second data from the second source is discarded; and computing a second mapping function between the first instance of the second hashed data and the first instance of the second secret, in which the second mapping function is stored and the first instance of the second hashed data and the first instance of the second secret are discarded.

In another example, the method may further include: receiving and hashing a second instance of second data from the second source to generate a second instance of the second hashed data; and applying the second mapping function to the second instance of the second hashed data to generate a second instance of the second secret, in which the key is generated using the second instance of the first secret and the second instance of the second secret.

In another example, the method may further include identifying a first instance of a second secret; generating a first instance of a first codeword based on the first instance of the second secret; receiving a first instance of second data from a second source, in which the second source is an error containing source; and computing a second mapping function between the first instance of second data from the second source and the first instance of the first codeword, in which the second mapping function is stored and the first instance of second data from the second source and the first instance of the first codeword are discarded.

In another example, the method may further include receiving a second instance of second data from the second source; applying the second mapping function to the second instance of second data from the second source to generate a second instance of the first codeword; and generating a second instance of the second secret based on the second instance of the first codeword, in which the key is generated using the second instance of the first secret and the second instance of the second secret as a key seed.

In another example, the method may further include updating the first source by binding an updated first source to the first secret; or adding a first owner by binding the first owner to the first secret.

In another example, the method may further include computing a recovery mapping function.

In another example, the method may further include receiving one or more of the first instance of first data from the first source or the second instance of first data from the first source from a central entity.

In another example, the method may further include generating the key using a first instance of the first secret.

Modifications, additions, or omissions may be made to the method 1600 without departing from the scope of the present disclosure. For example, in some examples, the method 1600 may include any number of other components that may not be explicitly illustrated or described.

Figure 17:
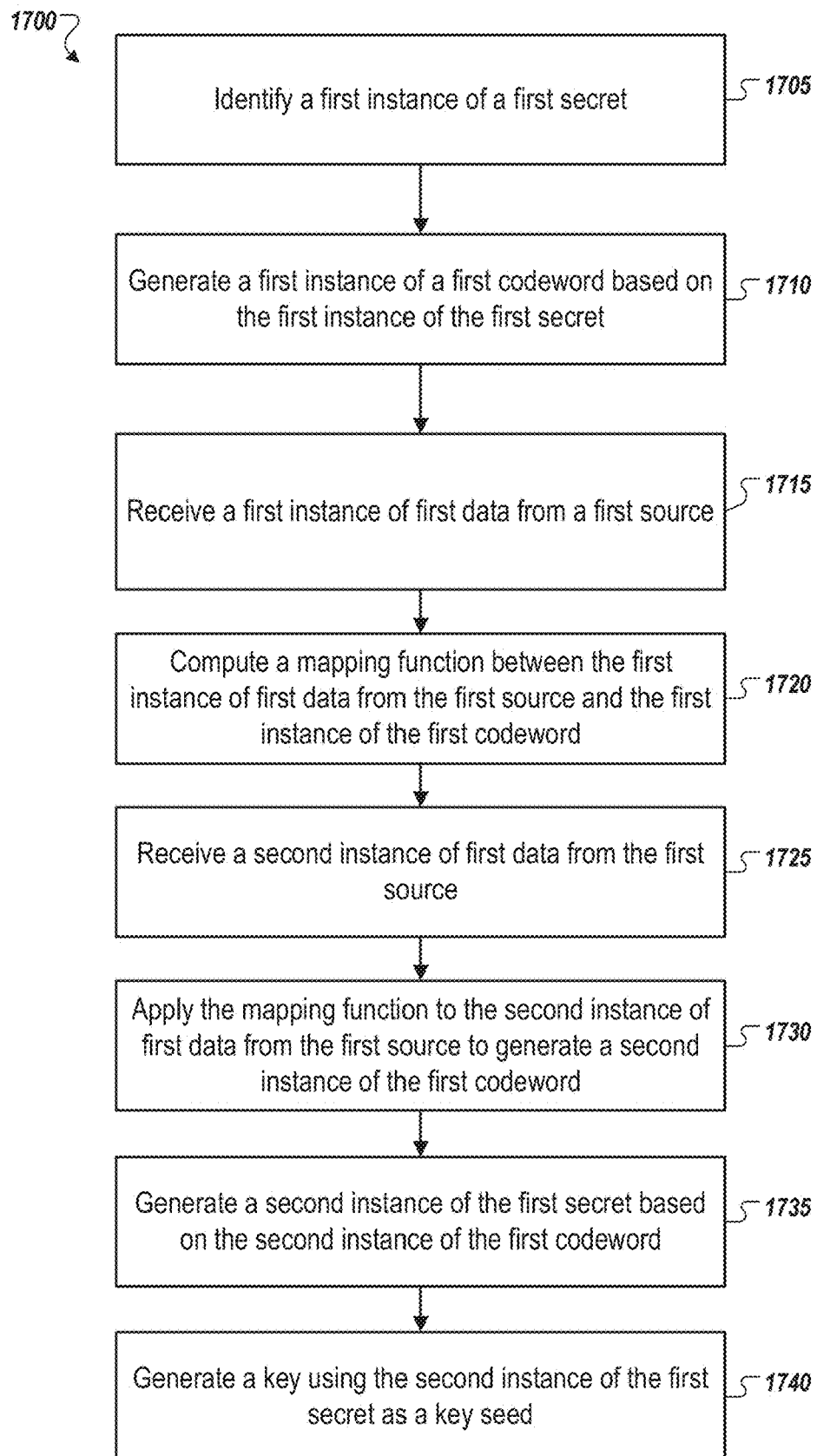
FIG. 17 illustrates a process flow for authentication and key regeneration in accordance with an example.

FIG. 17 illustrates a process flow of an example method 1700 that may be used for authentication and key regeneration, in accordance with at least one example described in the present disclosure. The method 1700 may be arranged in accordance with at least one example described in the present disclosure.

The method 1700 may be performed by processing logic that may include hardware (circuitry, dedicated logic, etc.), software (such as is run on a computer system or a dedicated machine), or a combination of both, which processing logic may be included in the processing device 2202 of FIG. 22, or another device, combination of devices, or systems.

The method 1700 may begin at block 1705 where the processing logic may include identifying a first instance of a first secret.

At block 1710, the processing logic may include generating a first instance of a first codeword based on the first instance of the first secret.

At block 1715, the processing logic may include receiving a first instance of first data from a first source.

At block 1720, the processing logic may include computing a mapping function between the first instance of first data from the first source and the first instance of the first codeword. The mapping function may be stored and the first instance of first data from the first source and the first instance of the first codeword may be discarded.

At block 1725, the processing logic may include receiving a second instance of first data from the first source.

At block 1730, the processing logic may include applying the mapping function to the second instance of first data from the first source to generate a second instance of the first codeword.

At block 1735, the processing logic may include generating a second instance of the first secret based on the second instance of the first codeword.

At block 1740, the processing logic may include generating a key using the second instance of the first secret as a key seed.

In one example, the source may be an error-containing source.

In one example, the method may further include generating the first instance of the first codeword using an error correction code encoder. In another example, the method may further include generating the second instance of the second secret using an error-correction code decoder.

In one example, the method may further include identifying a first instance of a second secret; generating a first instance of a second codeword based on the first instance of the second secret; receiving a first instance of second data from a second source; and computing a second mapping function between the first instance of second data from the second source and the first instance of the second codeword, in which the second mapping function is stored and the first instance of second data from the second source and the first instance of the second codeword are discarded.

In one example, the method may further include receiving a second instance of second data from the second source; applying the second mapping function to the second instance of second data from the second source to generate a second instance of the second codeword; and generating a second instance of the second secret based on the second instance of the second codeword, in which the key is generated using the second instance of the first secret and the second instance of the second secret.

In one example, the method may further include identifying a first instance of a second secret; receiving and hashing a first instance of second data from a second source to generate a first instance of second hashed data, in which the first instance of the second data from the second source is discarded; and computing a second mapping function between the first instance of the second hashed data and the first instance of the second secret, in which the second mapping function is stored and the first instance of the second hashed data and the first instance of the second secret are discarded.

In one example, the method may further include receiving and hashing a second instance of the second data from the second source to generate a second instance of the second hashed data; and applying the first mapping function to the second instance of the second hashed data to generate a second instance of the second secret, in which the key is generated using the second instance of the first secret and the second instance of the second secret.

In one example, the method may further include updating the first source by binding an updated first source to the first secret; or adding a first owner by binding the first owner to the first secret.

In one example, the method may further include computing a recovery mapping function.

In one example, the method may further include receiving one or more of the first instance of first data from the first source or the second instance of first data from the first source from a central entity.

In one example, the method may further include generating the key using a first instance of the first secret.

Modifications, additions, or omissions may be made to the method 1700 without departing from the scope of the present disclosure. For example, in some examples, the method 1700 may include any number of other components that may not be explicitly illustrated or described.

Figure 18:
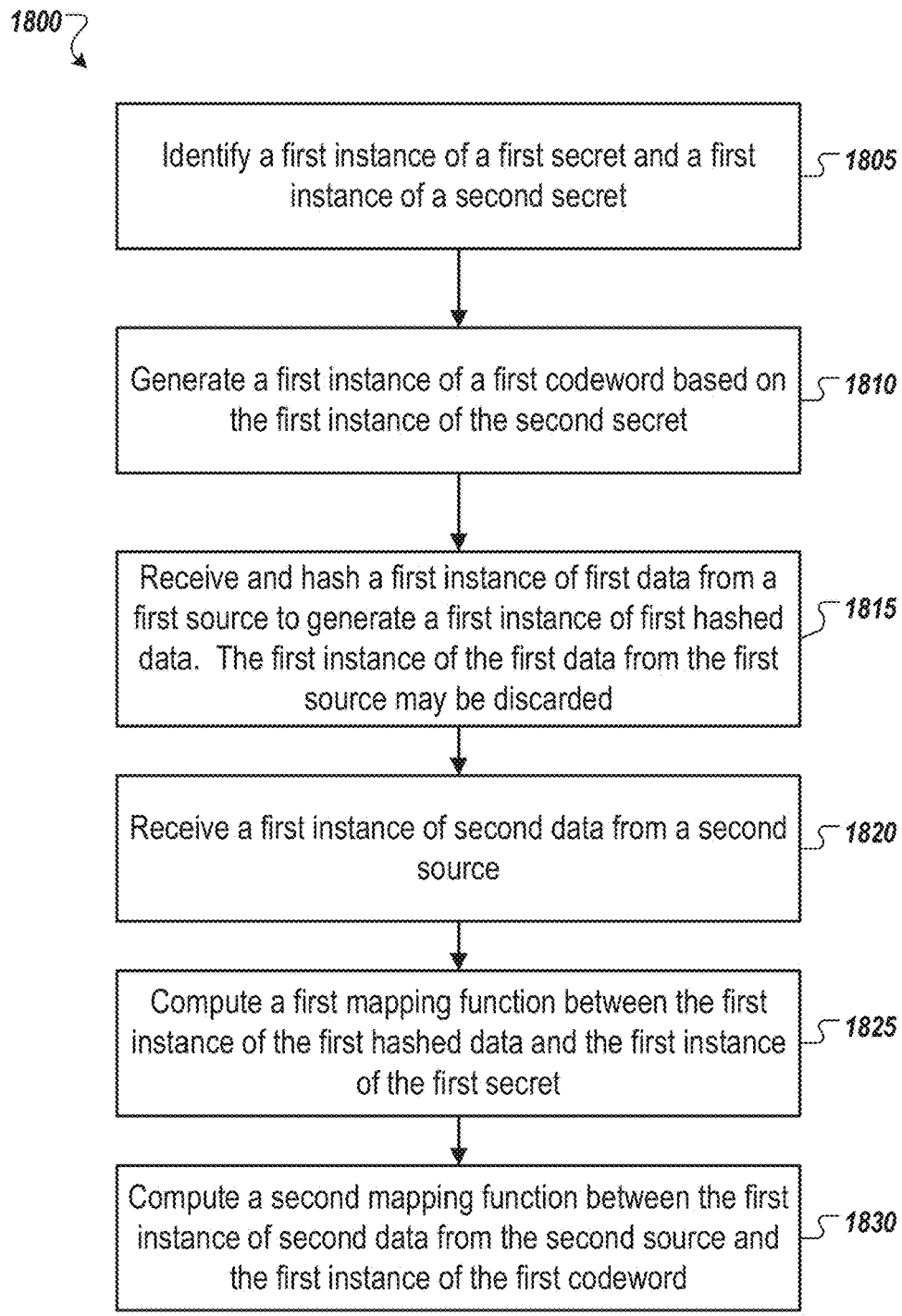
FIG. 18 illustrates a process flow for authentication and key regeneration in accordance with an example.

FIG. 18 illustrates a process flow of an example method 1800 that may be used for authentication and key regeneration, in accordance with at least one example described in the present disclosure. The method 1800 may be arranged in accordance with at least one example described in the present disclosure.

The method 1800 may be performed by processing logic that may include hardware (circuitry, dedicated logic, etc.), software (such as is run on a computer system or a dedicated machine), or a combination of both, which processing logic may be included in the processing device 2202 of FIG. 22, or another device, combination of devices, or systems.

The method 1800 may begin at block 1805 where the processing logic may include identifying a first instance of a first secret and a first instance of a second secret.

At block 1810, the processing logic may include generating a first instance of a first codeword based on the first instance of the second secret.

At block 1815, the processing logic may include receiving and hashing a first instance of first data from a first source to generate a first instance of first hashed data. The first instance of the first data from the first source may be discarded.

At block 1820, the processing logic may include receiving a first instance of second data from a second source.

At block 1825, the processing logic may include computing a first mapping function between the first instance of the first hashed data and the first instance of the first secret. The first mapping function may be stored and the first instance of the first hashed data and the first instance of the first secret may be discarded.

At block 1830, the processing logic may include computing a second mapping function between the first instance of second data from the second source and the first instance of the first codeword. The mapping function may be stored and the first instance of second data from the second source and the first instance of the first codeword may be discarded.

In one example, the method may further include receiving and hashing a second instance of first data from the first source to generate a second instance of the first hashed data; applying the first mapping function to the second instance of the first hashed data to generate a second instance of the first secret; and generating a key using the second instance of the first secret.

In one example, the method may further include receiving a second instance of second data from the second source; applying the mapping function to the second instance of second data from the second source to generate a second instance of the first codeword; and generating a second instance of the second secret based on the second instance of the first codeword, in which the key is generated using the second instance of the first secret and the second instance of the second secret as a key seed.

In one example, the first source may be an error-free source and the second source may be an error-containing source.

In one example, the method may include one or more of: (i) generating a first instance of a first secret, (ii) receiving first data from a first source, (iii) hashing the first data from the first source to create a first hashed data source, (iv)

determining a first mapping function between the first hashed data source and the first instance of the first secret, (v) generating a second instance of a first secret, (vi) applying error correction encoding to the second instance of the first secret to create a first codeword, (vii) receiving second data from a second source, (viii) determining a second mapping function between the second data from the second source and the first codeword, (ix) storing the first and second mapping function, (x) receiving third data from a third source, (xi) hashing the third data from the third source to produce a second hashed data source, (xii) retrieve the stored first mapping function, (xiii) apply the first mapping function to the second hashed data source to create a second instance of a first secret, (xiv) receiving fourth data from a fourth source, (xv) retrieving the stored second mapping function, (xvi) apply the second mapping function to the fourth data from the fourth source to create a second codeword, (xvii) apply error correction decoding to the second codeword to create a second instance of a second secret, (xviii) combine the second instance of the first secret and the second instance of the second secret into a key seed, or (xix) generate a key using the key seed.

Modifications, additions, or omissions may be made to the method 1800 without departing from the scope of the present disclosure. For example, in some examples, the method 1800 may include any number of other components that may not be explicitly illustrated or described.

Figure 19:
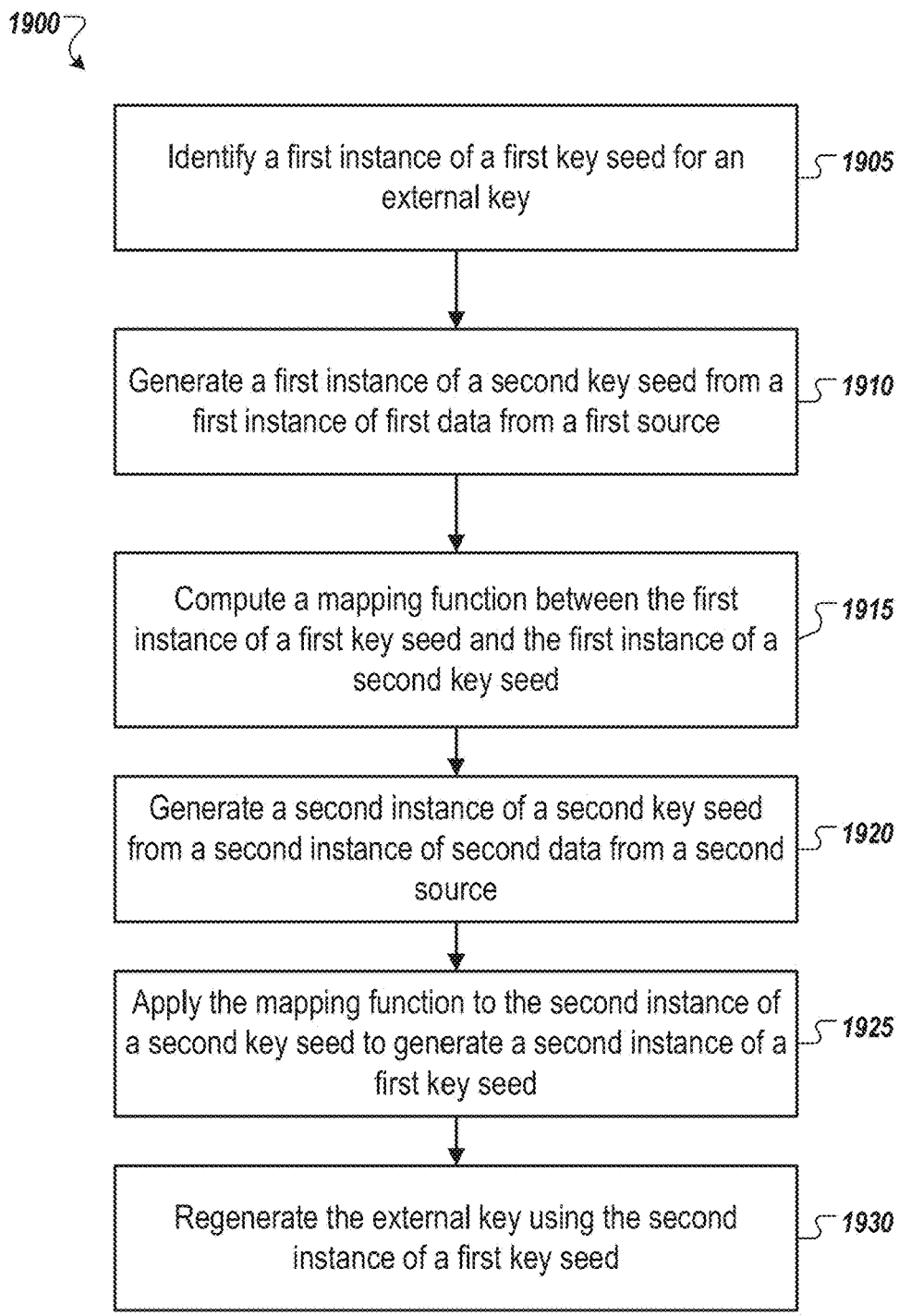
FIG. 19 illustrates a process flow for authentication and key regeneration in accordance with an example

FIG. 19 illustrates a process flow of an example method 1900 that may be used for authentication and key regeneration, in accordance with at least one example described in the present disclosure. The method 1900 may be arranged in accordance with at least one example described in the present disclosure.

The method 1900 may be performed by processing logic that may include hardware (circuitry, dedicated logic, etc.), software (such as is run on a computer system or a dedicated machine), or a combination of both, which processing logic may be included in the processing device 2202 of FIG. 22, or another device, combination of devices, or systems.

The method 1900 may begin at block 1905 where the processing logic may include identifying a first instance of a first key seed for an external key.

At block 1910, the processing logic may include generating a first instance of a second key seed from a first instance of first data from a first source.

At block 1915, the processing logic may computing a mapping function between the first instance of a first key seed and the first instance of a second key seed. The mapping function is stored and the first instance of a first key seed and first instance of a second key seed are discarded.

At block 1920, the processing logic may include generating a second instance of a second key seed from a second instance of second data from a second source.

At block 1925, the processing logic may include applying the mapping function to the second instance of a second key seed to generate a second instance of a first key seed.

At block 1930, the processing logic may include regenerating the external key using the second instance of a first key seed.

The method may further include identifying keywords from the external key. The method may further include converting the keywords into the first key seed. The method may further include exporting the keywords to external hardware. The method may further include exporting the keywords to software wallets. In one example, the external key may be for a cryptographic wallet.

Modifications, additions, or omissions may be made to the method 1900 without departing from the scope of the present disclosure. For example, in some examples, the method 1900 may include any number of other components that may not be explicitly illustrated or described.

Figure 20:
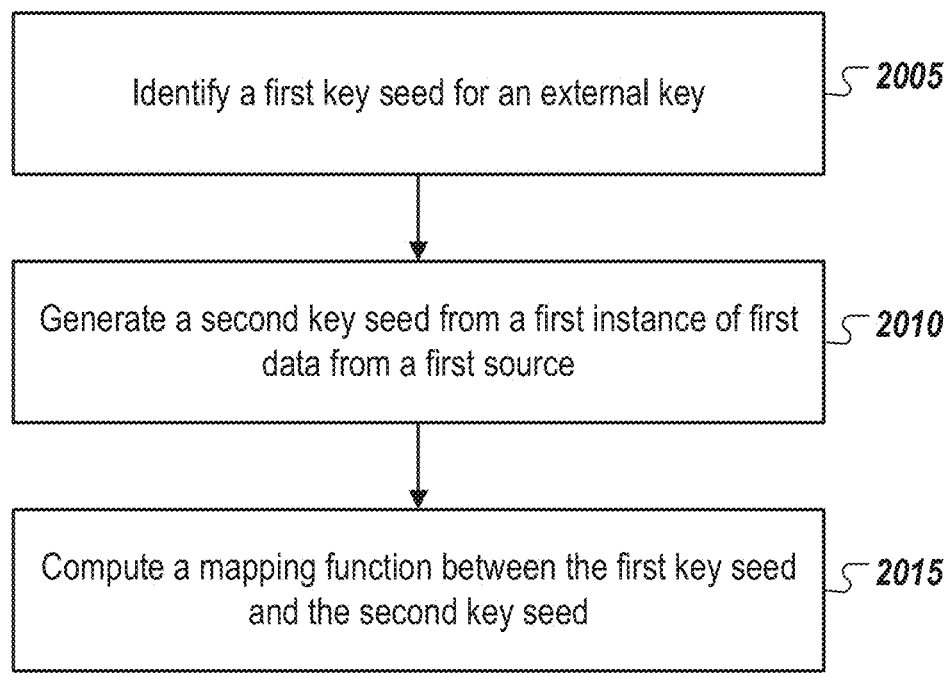
FIG. 20 illustrates a process flow for authentication and key regeneration in accordance with an example

FIG. 20 illustrates a process flow of an example method 2000 that may be used for authentication and key regeneration, in accordance with at least one example described in the present disclosure. The method 2000 may be arranged in accordance with at least one example described in the present disclosure.

The method 2000 may be performed by processing logic that may include hardware (circuitry, dedicated logic, etc.), software (such as is run on a computer system or a dedicated machine), or a combination of both, which processing logic may be included in the processing device 2202 of FIG. 22, or another device, combination of devices, or systems.

The method 2000 may begin at block 2005 where the processing logic may include identifying a first key seed for an external key.

At block 2010, the processing logic may include generating a second key seed from a first instance of first data from a first source.

At block 2015, the processing logic may computing a mapping function between the first key seed and the second key seed. The mapping function may be stored and the first key seed and second key seed may be discarded.

The method may further include identifying keywords from the external key. The method may further include converting the keywords into the first key seed. The method may further include exporting the keywords to external hardware. The method may further include exporting the keywords to software wallets. In one example, the external key may be for a cryptographic wallet. In another example, external key may be converted to a multifactor key.

Modifications, additions, or omissions may be made to the method 2000 without departing from the scope of the present disclosure. For example, in some examples, the method 2000 may include any number of other components that may not be explicitly illustrated or described.

Figure 21:
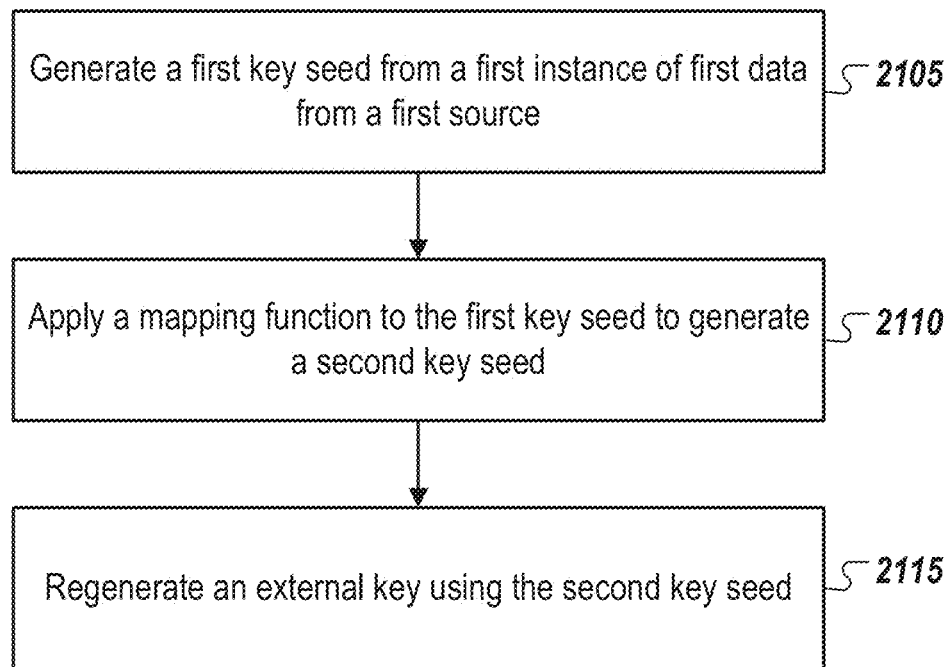
FIG. 21 illustrates a process flow for authentication and key regeneration in accordance with an example

FIG. 21 illustrates a process flow of an example method 2100 that may be used for authentication and key regeneration, in accordance with at least one example described in the present disclosure. The method 2100 may be arranged in accordance with at least one example described in the present disclosure.

The method 2100 may be performed by processing logic that may include hardware (circuitry, dedicated logic, etc.), software (such as is run on a computer system or a dedicated machine), or a combination of both, which processing logic may be included in the processing device 2202 of FIG. 22, or another device, combination of devices, or systems.

The method 2100 may begin at block 2105 where the processing logic may include generating a first key seed from a first instance of first data from a first source.

At block 2110, the processing logic may include applying a mapping function to the first key seed to generate a second key seed.

At block 2115, the processing logic may include regenerating an external key using the second key seed.

The method may further include identifying keywords from the external key. The method may further include converting the keywords into the first key seed. The method may further include exporting the keywords to external hardware. The method may further include exporting the keywords to software wallets. In one example, the external key may be for a cryptographic wallet. In another example, external key may be converted to a multifactor key.

Modifications, additions, or omissions may be made to the method 2100 without departing from the scope of the present disclosure. For example, in some examples, the method 2100 may include any number of other components that may not be explicitly illustrated or described.

For simplicity of explanation, methods and/or process flows described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

FIG. 22 illustrates a diagrammatic representation of a machine in the example form of a computing device 2200 within which a set of instructions, for causing the machine to perform any one or more of the methods discussed herein, may be executed. The computing device 2200 may include a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methods discussed herein, may be executed. In alternative examples, the machine may be connected (e.g., networked) to other machines in a local area network (LAN), an intranet, an extranet, or the Internet. The machine may operate in the capacity of a server machine in client-server network environment. The machine may include a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" may also include any collection of machines that individually or jointly execute a set (or multiple sets) of instructions to perform any one or more of the methods discussed herein.

The example computing device 2200 includes a processing device (e.g., a processor) 2202, a main memory 2204 (e.g., read-only memory (ROM), flash memory, dynamic random access memory (DRAM) such as synchronous DRAM (SDRAM)), a static memory 2206 (e.g., flash memory, static random access memory (SRAM)) and a data storage device 2216, which communicate with each other via a bus 2208.

Processing device 2202 represents one or more general-purpose processing devices such as a microprocessor, central processing unit, or the like. More particularly, the processing device 2202 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 2202 may also include one or more special-purpose processing devices such as an application specific integrated circuit (ASIC), a field programmable gate array (FPGA), a digital signal processor (DSP), network processor, or the like. The processing device 2202 is configured to execute instructions 2226 for performing the operations and steps discussed herein.

The computing device 2200 may further include a network interface device 2222 which may communicate with a network 2218. The computing device 2200 also may include a display device 2210 (e.g., a liquid crystal display (LCD) or a cathode ray tube (CRT)), an alphanumeric input device 2212 (e.g., a keyboard), a cursor control device 2214 (e.g., a mouse) and a signal generation device 2220 (e.g., a speaker). In at least one example, the display device 2210, the alphanumeric input device 2212, and the cursor control device 2214 may be combined into a single component or device (e.g., an LCD touch screen).

The data storage device 2216 may include a computer-readable storage medium 2224 on which is stored one or more sets of instructions 2226 embodying any one or more of the methods or functions described herein. The instructions 2226 may also reside, completely or at least partially, within the main memory 2204 and/or within the processing device 2202 during execution thereof by the computing device 2200, the main memory 2204 and the processing device 2202 also constituting computer-readable media. The instructions may further be transmitted or received over a network 2218 via the network interface device 2222.

While the computer-readable storage medium 2226 is shown in an example to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media.

A number of implementations have been described. Nevertheless, it will be understood that various modifications may be made without departing from the spirit and scope of the disclosure. Accordingly, other implementations are within the scope of the following claims.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various examples of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although examples of the present disclosure have been described in detail, it should be understood that the various changes, substitutions, and alterations could be made hereto without departing from the spirit and scope of the present disclosure.

What is claimed is:

1. A method, comprising:
    identifying a first instance of a first secret;
    receiving and hashing a first instance of first data from a first source to generate a first hashed instance of the first data, wherein the first instance of the first data from the first source is discarded;
    computing a first mapping function between the first hashed instance of the first data and the first instance of the first secret, wherein the first mapping function is stored and the first hashed instance of the first data and the first instance of the first secret are discarded;
    receiving and hashing a second instance of the first data from the first source to generate a second hashed instance of the first data;
    applying the first mapping function to the second hashed instance of the first data to generate a second instance of the first secret;
    identifying a first instance of a second secret;
    generating a first instance of a first codeword based on the first instance of the second secret;
    receiving a first instance of second data from a second source;
    computing a second mapping function between the first instance of second data from the second source and the first instance of the first codeword, wherein the second mapping function is stored and the first instance of second data from the second source and the first instance of the first codeword are discarded;
    receiving a second instance of second data from the second source;
    applying the second mapping function to the second instance of second data from the second source to generate a second instance of the first codeword;
    generating a second instance of the second secret based on the second instance of the first codeword; and
    generating a key using the second instance of the first secret and the second instance of the second secret.

2. The method of claim 1, wherein the first source is an error-free source.

3. The method of claim 1, further comprising:
    updating the first source by binding an updated first source to the first secret; or
    adding a first owner by binding the first owner to the first secret.

4. The method of claim 1, further comprising computing a recovery mapping function.

5. The method of claim 1, further comprising receiving one or more of the first instance of first data from the first source or the second instance of first data from the first source from a central entity.

6. The method of claim 1, wherein the key is generated using the first instance of the first secret.

7. The method of claim 1, further comprising revoking a first public key and creating a second public key.

8. A method, comprising:
    identifying a first instance of a first secret;
    generating a first instance of a first codeword based on the first instance of the first secret;
    receiving a first instance of first data from a first source;
    computing a mapping function between the first instance of first data from the first source and the first instance of the first codeword, wherein the mapping function is stored and the first instance of first data from the first source and the first instance of the first codeword are discarded;

receiving a second instance of first data from the first source;
applying the mapping function to the second instance of first data from the first source to generate a second instance of the first codeword;
generating a second instance of the first secret based on the second instance of the first codeword;
identifying a first instance of a second secret;
generating a first instance of a second codeword based on the first instance of the second secret;
receiving a first instance of second data from a second source; and
computing a second mapping function between the first instance of second data from the second source and the first instance of the second codeword, wherein the second mapping function is stored and the first instance of second data from the second source and the first instance of the second codeword are discarded;
receiving a second instance of second data from the second source;
applying the second mapping function to the second instance of second data from the second source to generate a second instance of the second codeword;
generating a second instance of the second secret based on the second instance of the second codeword; and
generating a key using the second instance of the first secret and the second instance of the second secret.

9. The method of claim 8, wherein the first source is an error-containing source.

10. The method of claim 8, further comprising generating the first instance of the first codeword using an error correction code encoder.

11. The method of claim 8, further comprising generating the second instance of the second secret using an error-correction code decoder.

12. The method of claim 8, further comprising one or more of:
updating the first source by binding an updated first source to the first secret; or
adding a first owner by binding the first owner to the first secret.

13. The method of claim 8, further comprising computing a recovery mapping function.

14. The method of claim 8, further comprising
receiving one or more of the first instance of first data from the first source or the second instance of first data from the first source from a central entity.

15. The method of claim 8, further comprising generating the key using a first instance of the first secret.

16. The method of claim 8, further comprising revoking a first public key and creating a second public key.

17. A method, comprising:
identifying a first instance of a first secret and a first instance of a second secret;
generating a first instance of a first codeword based on the first instance of the second secret;
receiving and hashing a first instance of first data from a first source to generate a first hashed instance of first data, wherein the first instance of the first data from the first source is discarded;
receiving a first instance of second data from a second source;
computing a first mapping function between the first hashed instance of the first data and the first instance of the first secret, wherein the first mapping function is stored and the first hashed instance of the first data and the first instance of the first secret are discarded, the first mapping function for generation of a second instance of the first secret;
computing a second mapping function between the first instance of second data from the second source and the first instance of the first codeword, wherein the second mapping function is stored and the first instance of second data from the second source and the first instance of the first codeword are discarded, the second mapping function for generation of a second instance of the second secret;
receiving and hashing a second instance of first data from the first source to generate a second hashed instance of the first data;
applying the first mapping function to the second hashed instance of the first data to generate the second instance of the first secret;
receiving a second instance of second data from the second source;
applying the second mapping function to the second instance of second data from the second source to generate a second instance of the first codeword;
generating the second instance of the second secret based on the second instance of the first codeword; and
generating a key using the second instance of the first secret and the second instance of the second secret.

18. The method of claim 17, wherein the first source is an error-free source and the second source is an error-containing source.

19. The method of claim 1, wherein the second source is an error containing source.

20. The method of claim 8, wherein the first source is an error-free source and the second source is an error-containing source.

21. The method of claim 8, wherein the first source and the second source are both error-containing sources.

22. The method of claim 1, further comprising generating the first instance of the first codeword using an error correction code encoder.

23. The method of claim 1, further comprising generating the second instance of the second secret using an error-correction code decoder.

24. The method of claim 3, further comprising:
updating the second source by binding an updated second source to the second secret; or
binding the first owner to the second secret.

25. The method of claim 12, further comprising one or more of:
updating the second source by binding an updated second source to the second secret; or
binding the first owner to the second secret.

26. The method of claim 6, wherein the key is generated using the first instance of the second secret.

27. The method of claim 17, wherein the key is generated using at least one of the first instance of the second or the first instance of the second secret.

* * * * *